US012292181B2

(12) United States Patent
Papa et al.

(10) Patent No.: US 12,292,181 B2
(45) Date of Patent: May 6, 2025

(54) CANOPY LUMINAIRE MOUNTING SYSTEM

(71) Applicant: LSI Industries, Inc., Cincinnati, OH (US)

(72) Inventors: Christopher Linn Papa, Liberty Township, OH (US); John D. Boyer, Lebanon, OH (US); Eric Jon Mooar, Liberty Township, OH (US); Michael D. Wyatt, Hamilton, OH (US)

(73) Assignee: LSI Industries, Inc., Cincinnati, OH (US)

( * ) Notice: Subject to any disclaimer, the term of this patent is extended or adjusted under 35 U.S.C. 154(b) by 0 days.

(21) Appl. No.: 17/904,803

(22) PCT Filed: May 26, 2022

(86) PCT No.: PCT/US2022/031165

§ 371 (c)(1),
(2) Date: Dec. 1, 2022

(87) PCT Pub. No.: WO2022/251522

PCT Pub. Date: Dec. 1, 2022

(65) Prior Publication Data

US 2024/0210016 A1 Jun. 27, 2024

Related U.S. Application Data

(60) Provisional application No. 63/193,389, filed on May 26, 2021.

(51) Int. Cl.
*F21V 21/03* (2006.01)
*F21V 23/06* (2006.01)

(52) U.S. Cl.
CPC .............. *F21V 21/03* (2013.01); *F21V 23/06* (2013.01)

(58) Field of Classification Search
CPC ........................................................ F21V 23/06
See application file for complete search history.

(56) References Cited

U.S. PATENT DOCUMENTS 6,059,422 A * 5/2000 Fischer ................. F21V 17/107
362/147
6,780,049 B1 * 8/2004 D'Angelo ............. F04D 29/601
439/537

(Continued)

FOREIGN PATENT DOCUMENTS

GB 409180 A 4/1934
GB 2435722 A 9/2007

OTHER PUBLICATIONS

Halo Lamp IB518245ML Instruction manual, published 2020 (Year: 2020).*

(Continued)

*Primary Examiner* — Evan P Dzierzynski
(74) *Attorney, Agent, or Firm* — Wood Herron & Evans LLP

(57) ABSTRACT

A canopy luminaire mounting system includes a canopy socket assembly configured to be mounted to canopy structure. A canopy luminaire includes a mating connector assembly that is configured to be received by the canopy socket assembly. The canopy luminaire is removably secured to the canopy socket assembly in response to relative rotation of the canopy luminaire and the canopy socket assembly. The canopy socket assembly may include at least one electrical contact and the mating connector assembly of the canopy luminaire may include at least one second electrical contact that cooperates with the at least one first electrical contact to establish an electrical connection therebetween in response to the relative rotation of the canopy luminaire and the canopy socket assembly.

28 Claims, 37 Drawing Sheets

(56) References Cited

U.S. PATENT DOCUMENTS

| | | | | |
|---|---|---|---|---|
| 6,843,580 | B2 | 1/2005 | Fischer et al. | |
| 11,215,350 | B1 * | 1/2022 | Raghavan | F21V 23/06 |
| 2009/0258524 | A1 * | 10/2009 | McEnery | H01R 33/94 439/334 |
| 2014/0268825 | A1 * | 9/2014 | Lay | F21V 21/03 362/371 |
| 2015/0055353 | A1 * | 2/2015 | Hutchens | F16M 13/02 362/370 |
| 2017/0307189 | A1 * | 10/2017 | Eidsvold | F21S 8/026 |
| 2019/0312396 | A1 * | 10/2019 | Kohen | H01R 13/7038 |
| 2020/0326063 | A1 * | 10/2020 | Duckworth | H01R 13/443 |

OTHER PUBLICATIONS

U.S. International Searching Authority, International Search Report and Written Opinion of the International Searching Authority, International Application No. PCT/US22/31165, mailed Sep. 9, 2022 (9 pages).

The International Bureau of WIPO, International Preliminary Report On Patentability, International Application No. PCT/US2022/031165, mailed Dec. 7, 2023 (7 pages).

* cited by examiner

CANOPY LUMINAIRE MOUNTING SYSTEM

CROSS-REFERENCE TO RELATED APPLICATIONS

The present application is a submission under 35 U.S.C. § 371 of International Application No. PCT/US2022/031165, filed May 26, 2022, which claims the filing benefit of U.S. Provisional Application Ser. No. 63/193,389, filed May 26, 2021, the disclosures of which are incorporated herein by reference in their entireties.

FIELD OF THE INVENTION

The present invention relates generally to luminaires and, more particularly, to a luminaire mounting system for installing a luminaire to a canopy structure.

BACKGROUND OF THE INVENTION

Petroleum canopy lighting installation and maintenance traditionally is a multi-step process requiring access to both the topside and bottom-side of the canopy structure which supports the canopy lighting, such as light emitting diode ("LED") canopy luminaires. Various manufacturers of petroleum lighting exist in the marketplace and their means of installation and maintenance all vary to some degree. One consistency amongst the industry is a requirement for a canopy penetration hole to be made through the canopy decking to pass the electrical make-up connections for the canopy luminaire from the bottom-side of the canopy to the topside where the electrical service and conduit for the canopy luminaire is installed. The number of canopy penetration holes vary, and typically 2-4 more holes are required in the canopy structure in which mechanical fasteners are installed to secure the canopy luminaire to the canopy decking. It is desired to minimize the number of canopy penetrations as each is a weak point subject to water leakage from the topside to bottom-side of the canopy decking.

A typical canopy luminaire installation process starts on the bottom-side of the canopy with the mechanical fastening of the luminaire to the canopy decking and passing of the electrical makeup section of the luminaire to the topside of the canopy. The installer then proceeds to the topside of the canopy and performs the electrical make-up and connection to the luminaire. Uninstallation, replacement and/or maintenance is done in the reverse order starting with access to the topside of the canopy to disconnect the electrical, and then moving to the bottom-side of the canopy for removal or access to the luminaire.

In a new canopy installation, the luminaires are typically mechanically attached to the canopy structure by the mechanical contractor that erected the canopy. Electrical connection is required to be performed by an electrical contractor that may or may not perform the electrical work at time of canopy construction. This presents the opportunity for the electrical make-up section of the luminaire to be exposed to the elements, moisture and debris for extended periods of time resulting in potential damage or failure to the luminaire. It is not uncommon for the luminaire electrical connections to be left open for weeks during this process.

During a maintenance or canopy fixture replacement event on an existing canopy structure, drive lanes under the canopy are required to be closed for safety. The contractor is required to access the topside of the canopy for electrical disconnect and then subsequently move to the bottom-side of the canopy for fixture removal/maintenance. This can be a time-consuming event and the resultant lane closures at the fuel pumps lead to loss of revenue for the customer and increased service fees from the electrical contractor due to the labor costs associated with the length of time required for the canopy luminaire service.

Therefore, there is a need in the industry, such as at petroleum service stations, for a canopy luminaire mounting system that addresses these and other problems associated with conventional methods of installing canopy luminaires in a canopy structure.

SUMMARY OF THE INVENTION

The present invention overcomes the foregoing and other shortcomings and drawbacks of canopy luminaire mounting systems heretofore known. While the invention will be described in connection with certain embodiments, it will be understood that the invention is not limited to these embodiments. On the contrary, the invention includes all alternatives, modifications and equivalents as may be included within the spirit and scope of the present invention.

The canopy luminaire mounting system of the present invention is particularly designed to simplify the installation of a canopy luminaire to a canopy structure with increased reliability and quality of the canopy luminaire installation, as well as providing economic benefits by the simplified manner of the canopy luminaire installation process.

According to one embodiment, the canopy luminaire mounting system of the present invention provides both a mechanical means of attachment of the canopy luminaire to the canopy structure and simplified electrical connection of the canopy luminaire with electrical connections from a source of power from a bottom-side of the canopy deck during installation of the canopy luminaire.

According to another embodiment, the canopy luminaire mounting system of the present invention not only provides mechanical means of attachment of the canopy luminaire to the canopy structure, but also simultaneous electrical connection of the canopy luminaire with electrical connections from a source of power, from the bottom-side of the canopy deck during installation of the canopy luminaire. In this way, topside access to a source of power is not required during installation of the canopy luminaire to the canopy deck.

According to one exemplary embodiment of the present invention, a canopy luminaire mounting system is provided having a canopy socket assembly that is configured to be mounted to a canopy structure, such as a canopy deck. A canopy luminaire is provided with a mating connector assembly that is configured to be received by the canopy socket assembly during installation of the canopy luminaire to the canopy deck. The canopy luminaire is removably secured to the canopy socket assembly in response to relative rotation of the canopy luminaire and the canopy socket assembly.

In one embodiment, the canopy socket assembly is configured to be received in a canopy penetration hole formed in the canopy structure from a bottom-side of the canopy structure. The canopy socket assembly includes a spring-lock mechanism that is configured to engage a topside of the canopy structure to retain the canopy socket assembly in the canopy penetration hole. A locking ring may be attached to the canopy socket assembly that is configured to engage the topside of the canopy structure.

According to one embodiment of the present invention, the canopy socket assembly includes at least one electrical contact and a mating connector assembly of the canopy luminaire includes at least one second electrical contact that cooperates with the at least one first electrical contact to establish an electrical connection therebetween.

In one embodiment, the at least one second electrical contact cooperates with the at least one first electrical contact to establish an electrical connection therebetween in response to relative rotation of the canopy luminaire and the canopy socket assembly.

In one embodiment, the first electrical contact comprises an electrical connector provided at a lower end of a wiring harness and the at least one second electrical contact comprises an electrical socket which is configured to electrically connect with the electrical connector.

In one embodiment, the at least one electrical contact is provided on a spring-loaded electrical plunger that is mounted for vertical movement within the canopy socket assembly. The electrical plunger may be keyed with an inner surface of the canopy socket assembly to prevent rotation of the electrical plunger within the canopy socket assembly. The electrical plunger is vertically biased relative to the canopy socket assembly by at least one spring that is mounted between the electrical plunger in the canopy socket assembly.

According to one embodiment, the mating connector assembly provided on the canopy luminaire includes a plurality of mounting lugs which extend radially outwardly from an annular side wall of the mating connector assembly. The plurality of mounting lugs are configured to cooperate with an inner surface of the canopy socket assembly to removably secure the canopy luminaire to the canopy socket assembly in response to relative rotation of the canopy luminaire and the canopy socket assembly.

The mating connector assembly may include a connector mount that is supported by the mating connector assembly.

In one embodiment, the connector mount supports an electrical connector that is electrically coupled to the luminaire. Alternatively, the connector mount may support a plurality of male electrical contacts, a plurality of spring-biased connector pins or a plurality of electrical connector blades according to various embodiments of the present invention.

The electrical plunger mounted within the canopy socket assembly may support a plurality of female electrical contacts, a plurality of electrical traces and/or electrical pads or a plurality of annular electrical connector plates according to various embodiments.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

Figure 1:
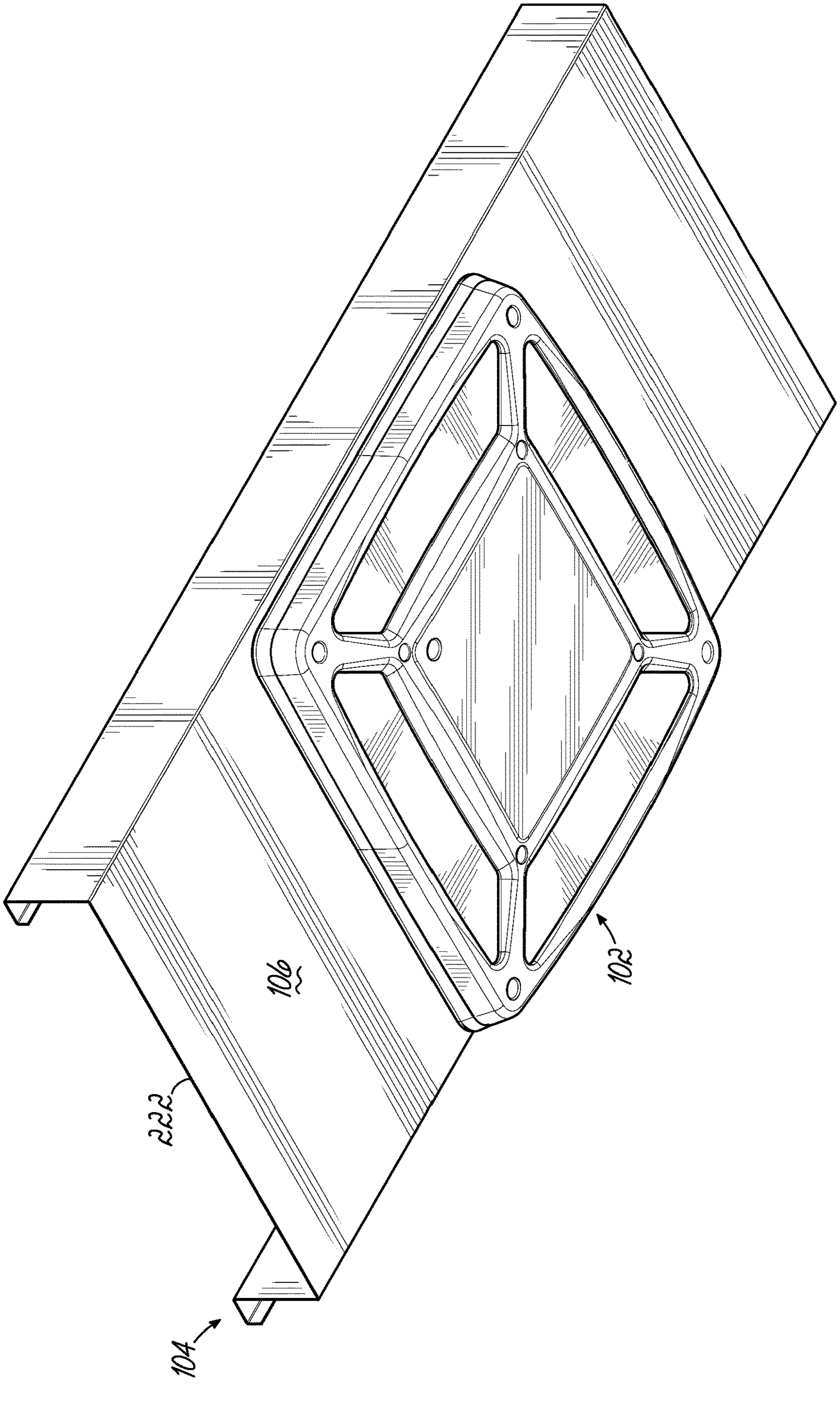
FIG. 1 is a bottom perspective view of a canopy luminaire mounted to a canopy deck according to an exemplary embodiment of the present invention.

Turning now to the Figures, and to FIGS. 1-7 in particular, a unique canopy luminaire mounting system 100 according to one exemplary embodiment of the present invention is shown that simplifies and speeds the installation and service, and increases the reliability, of a canopy luminaire 102 supported by a canopy structure 104, such as the deck of the canopy. The present invention, as will be described in connection with the exemplary embodiment of FIGS. 1-7, provides both mechanical means of attachment of the canopy luminaire 102 to the canopy structure 104 and simplified electrical connection of the canopy luminaire 102 with electrical connections from a source of power from the bottom-side 106 of the canopy deck 104 during installation of the canopy luminaire 102.

In each of the exemplary embodiments described in detail below, the canopy luminaires 102, 302, 502 and 702 may comprise the SCOTTSDALE® VERTEX™ Canopy Lighting Fixture or the SCOTTSDALE® SCM Canopy Lighting Fixture, both being light emitting diode ("LED") canopy luminaires commercially available from LSI Industries, Inc. of Cincinnati, Ohio.

The canopy luminaire mounting system 100 according to FIGS. 1-7 comprises, in one embodiment, as shown in FIGS. 2A-2C, 3A-3B and 7A-7D, a canopy socket assembly 108 that includes a spring-loaded plunger 110 supported for vertical movement within a housing 112 of the canopy socket assembly 108. The plunger 110 includes an annular side wall 114 having an outer surface 116 that is keyed with an inner surface 118 of an annular side wall 120 of the housing 112 to prevent rotation of the of the plunger 110 relative to the housing 112 during vertical movement of the plunger 110 within the housing 112 as described in greater detail below. As shown in the figured according to one exemplary embodiment, the annular side wall 120 of the housing 112 includes a series of alternating and vertically oriented ribs 122 and channels 124, and the annular side wall 114 of the plunger 110 also includes a series of alternating and vertically oriented ribs 126 and channels 128. The ribs 122 of the housing 112 are keyed with the channels 128 of the plunger 110, while the ribs 126 of the plunger 110 are keyed with the channels 124 of the housing 112.

In addition, the canopy socket assembly 108 includes an electrical wiring enclosure or junction box 130 having an annular side wall 132 which includes one or more electrical conduit connection points 134. The electrical wiring enclosure or junction box 130 includes a removable access cover 136 that is sealed with a gasket 138 (FIGS. 3B and 5) to an upper annular edge 140 of the electrical wiring enclosure or junction box 130 to provide access to an interior of the electrical wiring enclosure or junction box 130 as needed.

The electrical wiring enclosure or junction box 130 includes a bottom wall 142 which extends radially beyond the outer periphery of the annular side wall 132 to form a mounting flange 144 which is connected to an upper annular edge 146 of the housing 112 via suitable fasteners 147. The bottom wall 142 of the electrical wiring enclosure or junction box 130 has an internal boss 148 (FIG. 3A) to provide a ground electrical connection to the electrical wiring enclosure or junction box 130.

Figure 3A:
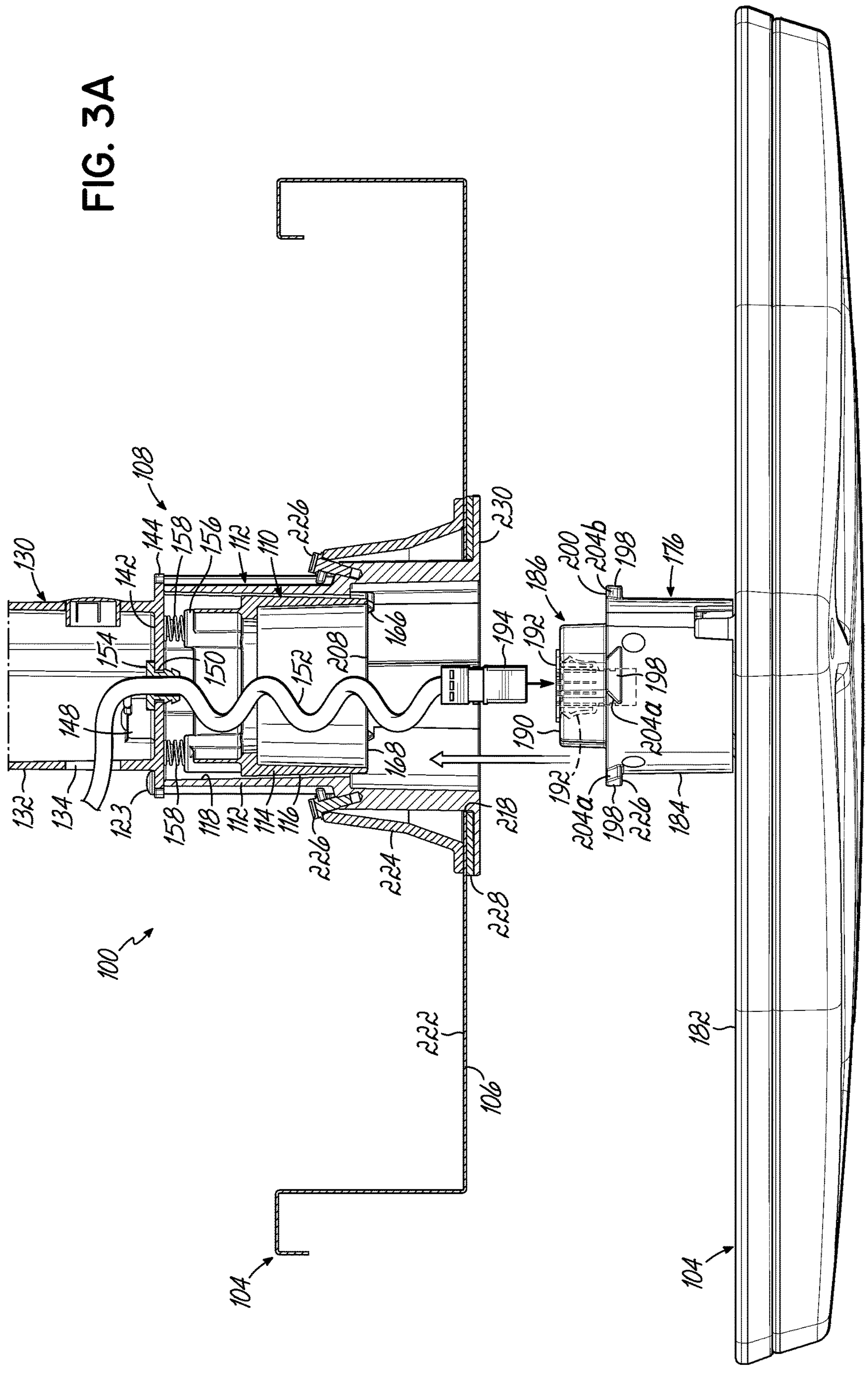
FIG. 3A is a side plan view, partially in cross-section, showing the canopy luminaire mounting system of FIGS. 2A-2C prior to mounting of the canopy luminaire to the canopy deck.
Figure 3B:
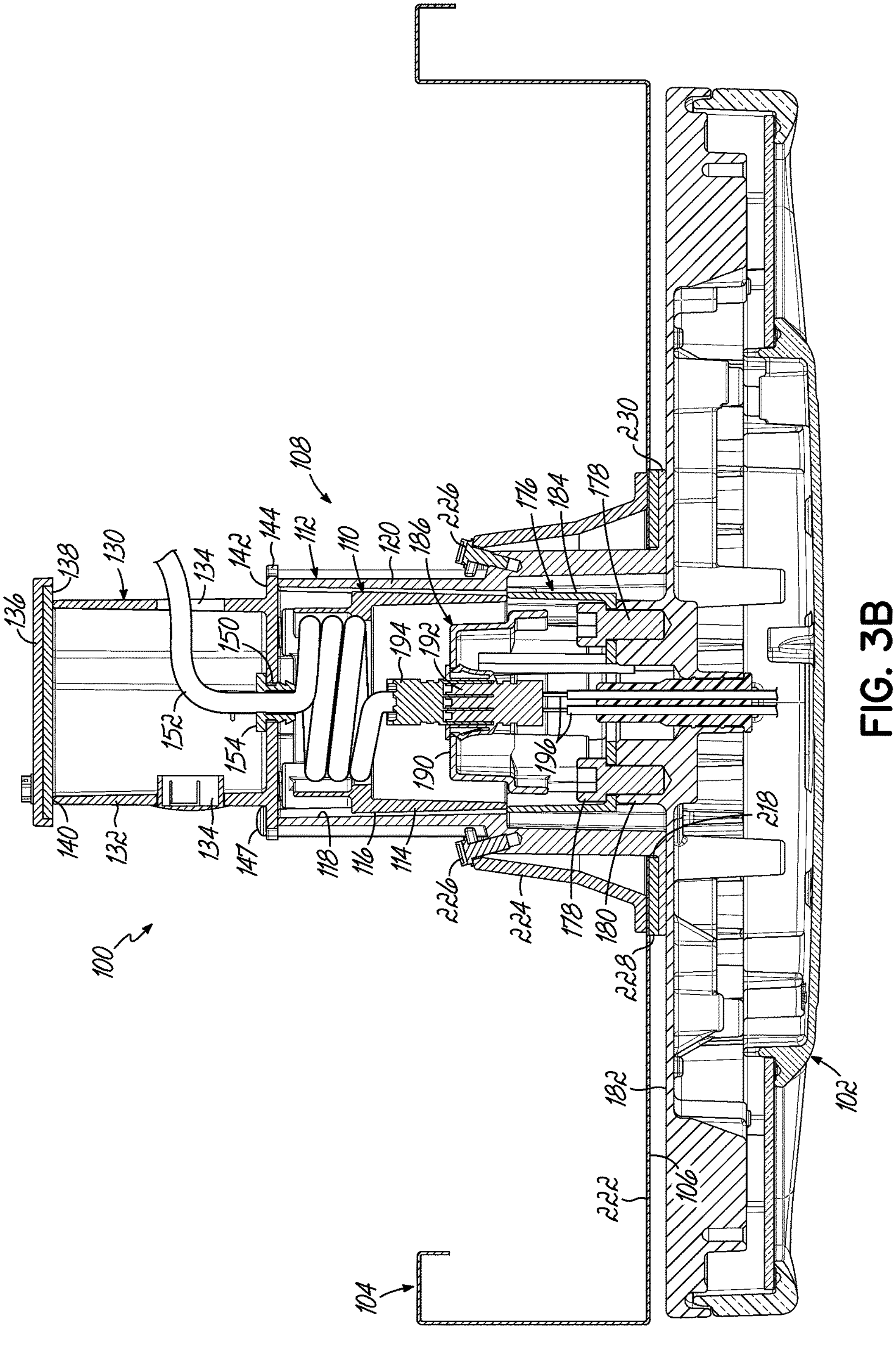
FIG. 3B is a side plan view, in cross section, showing the canopy luminaire mounting system of FIGS. 2A-2C and 3A after mounting of the canopy luminaire to the canopy deck.

As shown in FIGS. 3A and 3B, and as will be described in greater detail below, the bottom wall 142 of the electrical wiring enclosure or junction box 130 includes an aperture 150 formed therethrough which allows a prewired quick connect/disconnect harness 152 to pass from the electrical wiring enclosure or junction box 130 to an interior of the housing 112. A grommet 154 is provided in the aperture 150 to provide a water-tight seal between the bottom wall 142 and the quick connect/disconnect harness 152.

Figure 7A:
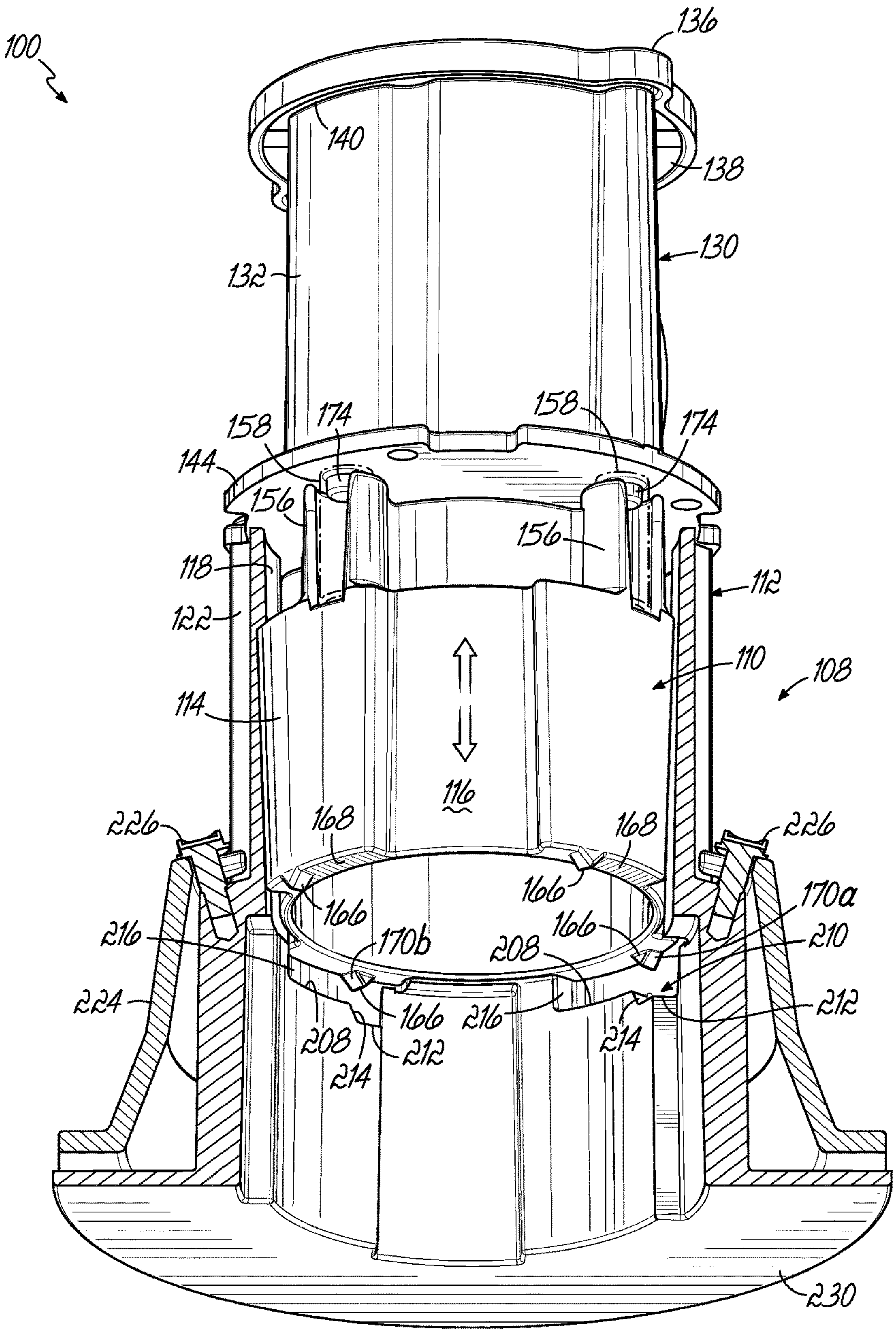
FIGS. 7A-7D are perspective views, partially in cross section, showing mounting of the mating connector assembly of FIG. 4 and a spring-loaded plunger within the canopy socket assembly of FIGS. 2A-2C, 3A-3B, 5 and 6A-6C.
Figure 7B:
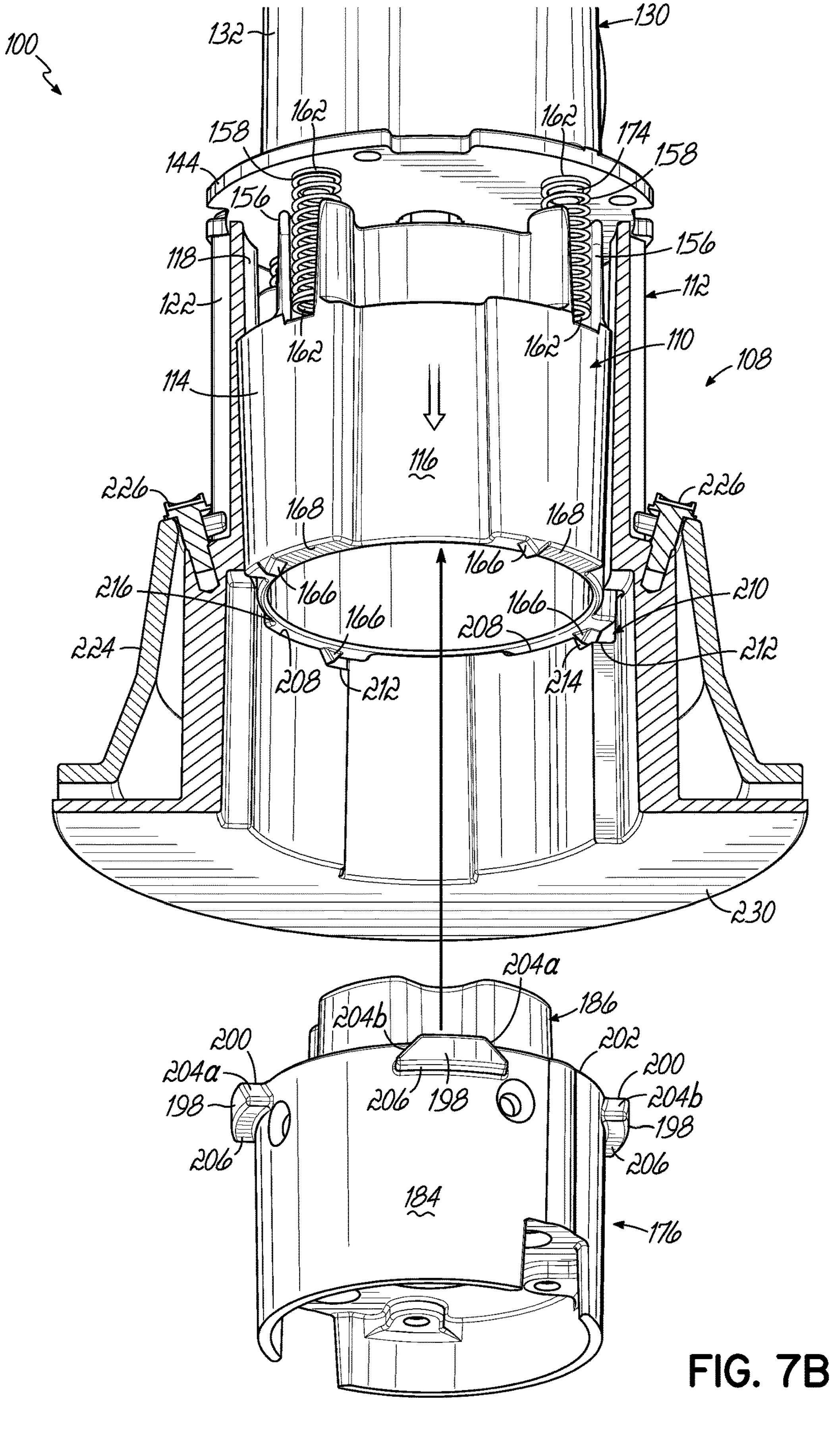
Figure 7C:
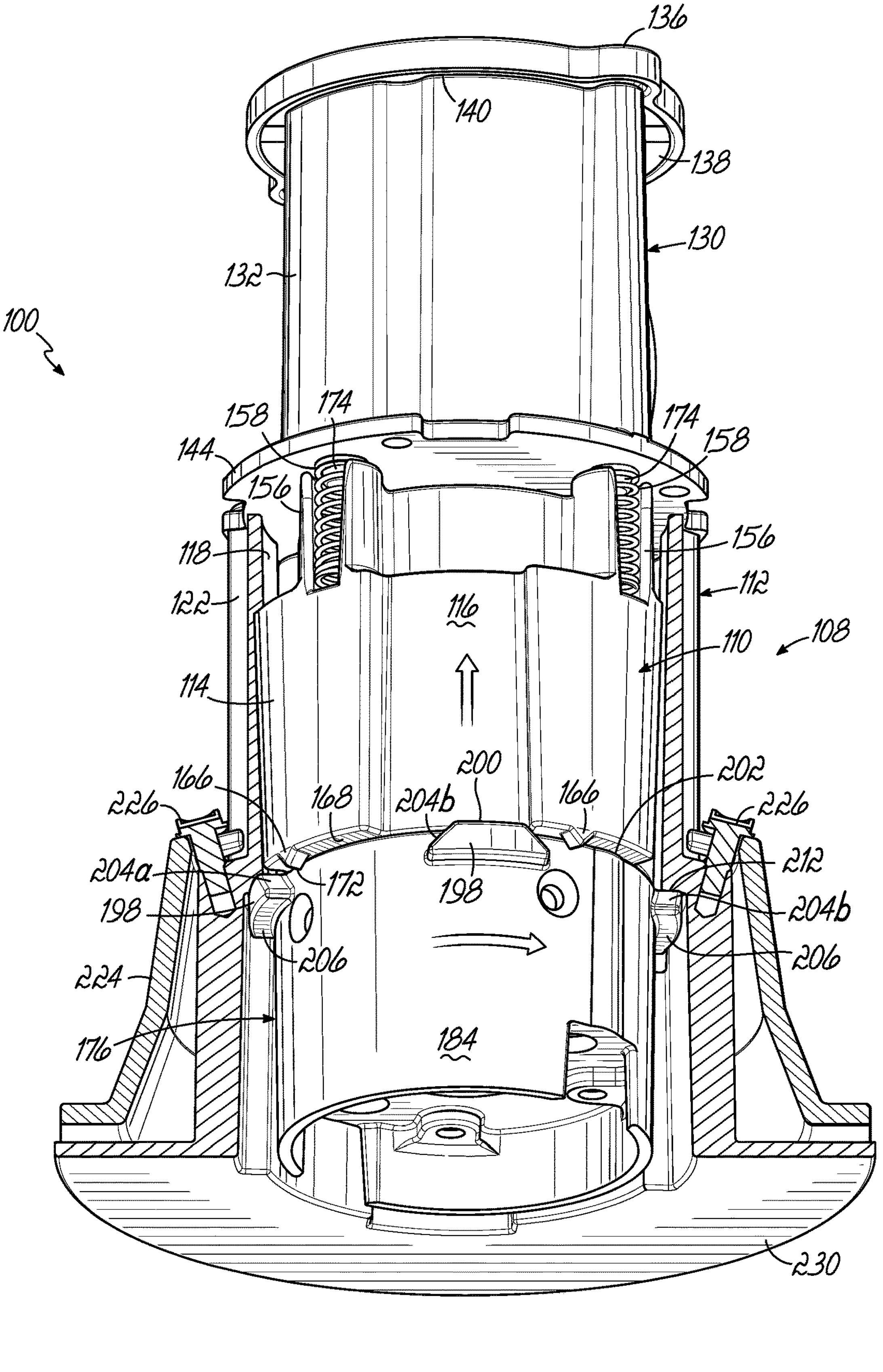
Figure 7D:
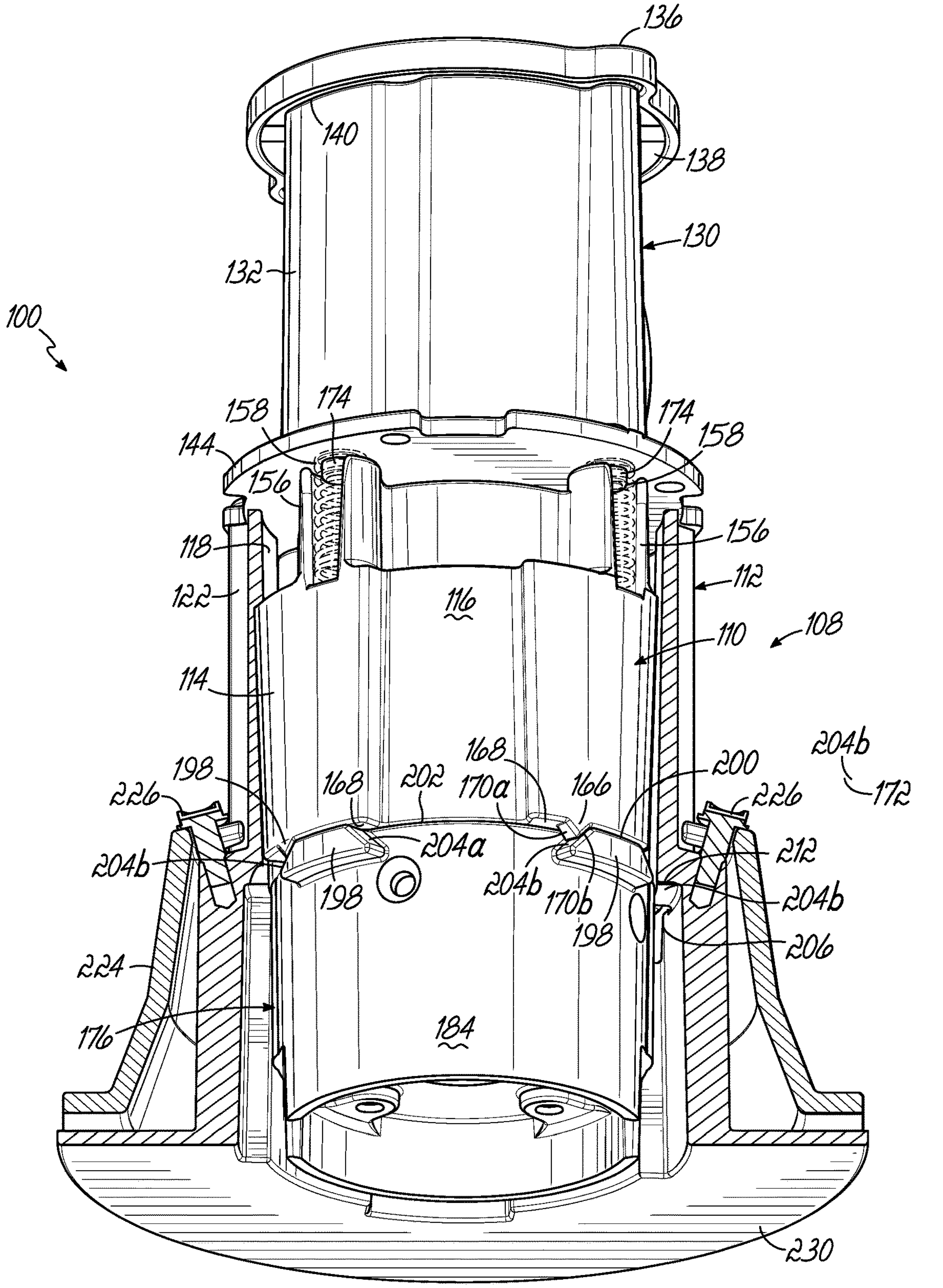

As shown in the exemplary embodiment of FIGS. 2A, 3A, 5 and 7B-7D, the plunger 110 includes four spring seats 156 provided about an upper portion of the plunger 110 that each receive a respective compression spring 158. In one embodiment, each of the springs 158 is orientally vertically and has one free end 160 supported in the respective spring seat 156 and an opposite free end 162 extending upwardly beyond an upper annular edge 164 of the annular side wall 114 of the plunger 110 (FIGS. 7C-7D).

For reasons described in greater detail below, the plunger 110 includes four nibs 166 which extend downwardly from a lower annular edge 168 of the plunger 110 as shown in FIGS. 7A-7D and are circumferentially spaced about the lower annular edge 168 of the plunger 110. In one exemplary embodiment, each nib 166 has a pair of converging faces 170*a*, 170*b* which join at a common downwardly facing edge 172 which is spaced downwardly from the lower annular edge 168 of the plunger 110.

As shown in FIGS. 7A and 7D, the bottom wall 142 of the electrical wiring enclosure or junction box 130 includes four bosses 174 which extend downwardly from the bottom wall 142 and are in vertical registry with the respective free ends 162 of the springs 158 and the four spring seats 156. The free ends 162 of the springs 158 receive the respective bosses 174 so that the respective positions of the springs 158 are maintained between the spring seats 156 and the bosses 174. The four springs 158 are located between the four spring seats 156 and the bottom wall 142 of the electrical wiring enclosure or junction box 130 so that the springs 158 bias the plunger 110 downwardly within the housing 112, but the springs 158 are compressible so as to allow the plunger 110 to move upwardly within the housing 112 in response to an upward vertical force being applied to the plunger 110 as will be described in greater detail below.

Referring now to FIGS. 2A-2C, 3A-3B, 4, 6A-6C and 7A-7D, the canopy luminaire 102 includes a mating connector assembly 176 mounted, via fasteners 178 (FIG. 3B), to a mounting boss 180 (FIGS. 9 and 10B) which extends upwardly from an upper wall 182 of the canopy luminaire 102 that faces the canopy deck 104 during installation and use of the canopy luminaire 102.

Figure 2A:
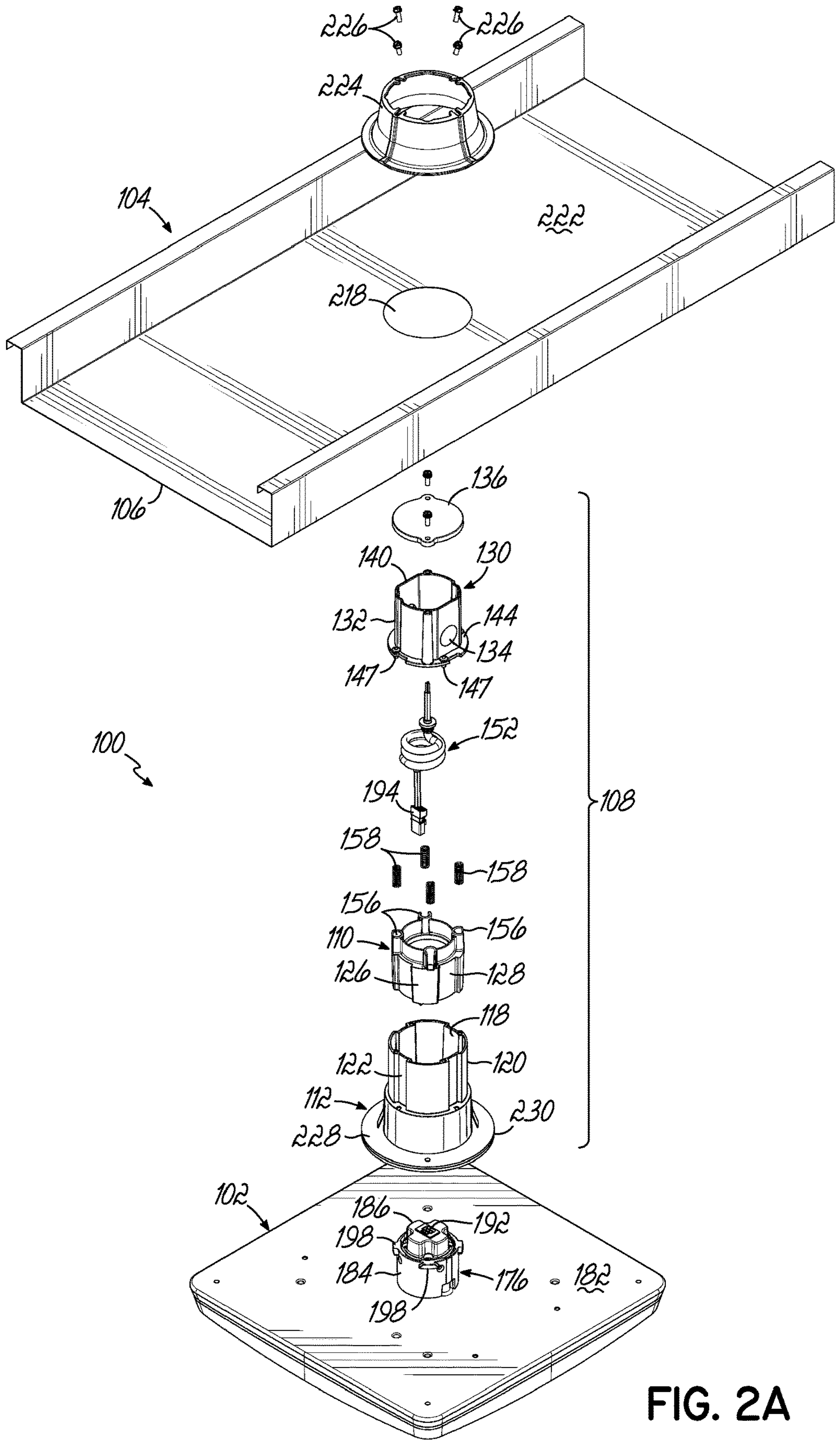
FIG. 2A is an exploded disassembled view of a canopy luminaire mounting system according to one embodiment of the present invention for mounting a canopy luminaire to a canopy deck.
Figure 2B:
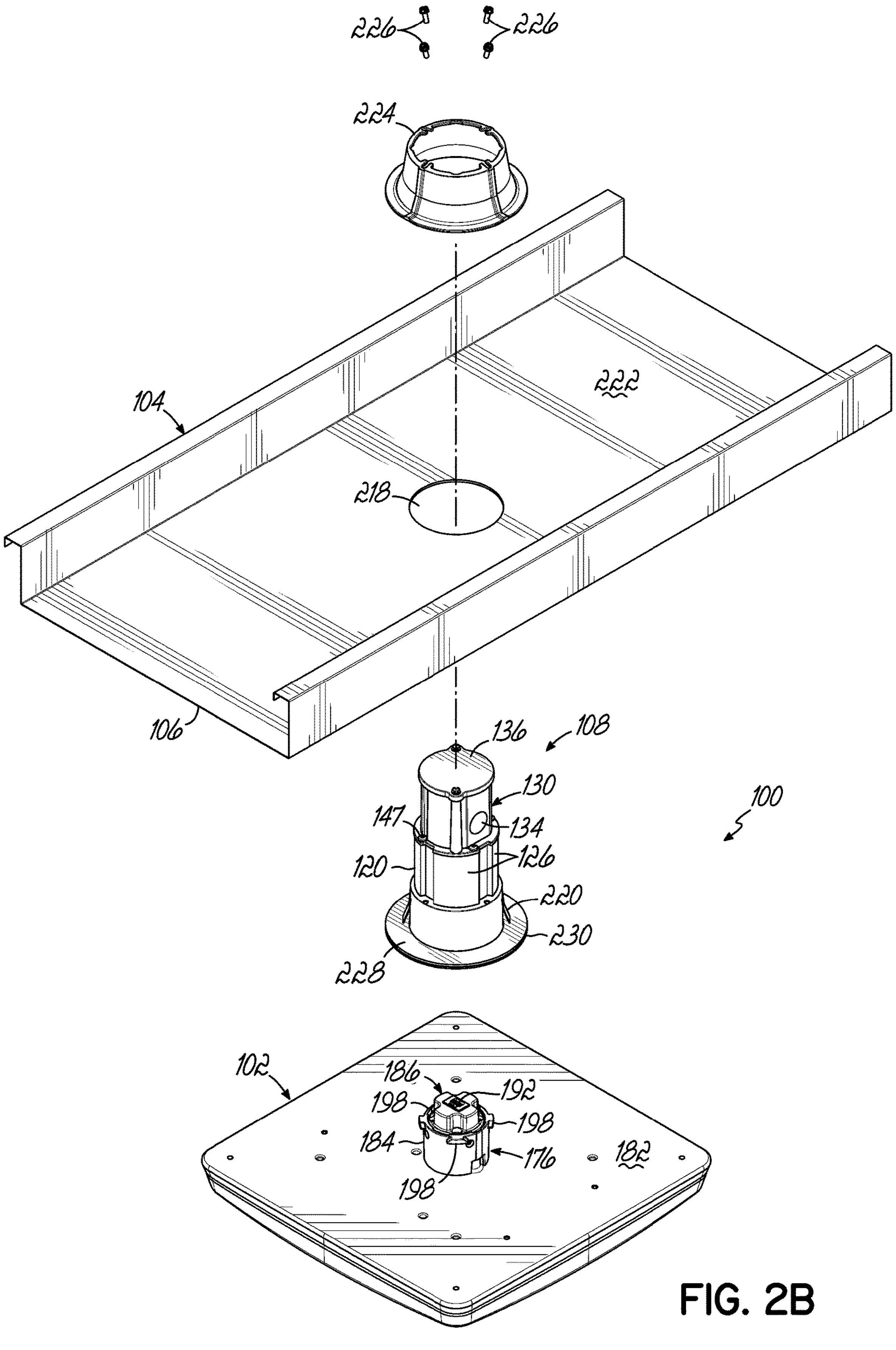
FIG. 2B is an exploded partially assembled view of the canopy luminaire mounting system of FIG. 2A.
Figure 2C:
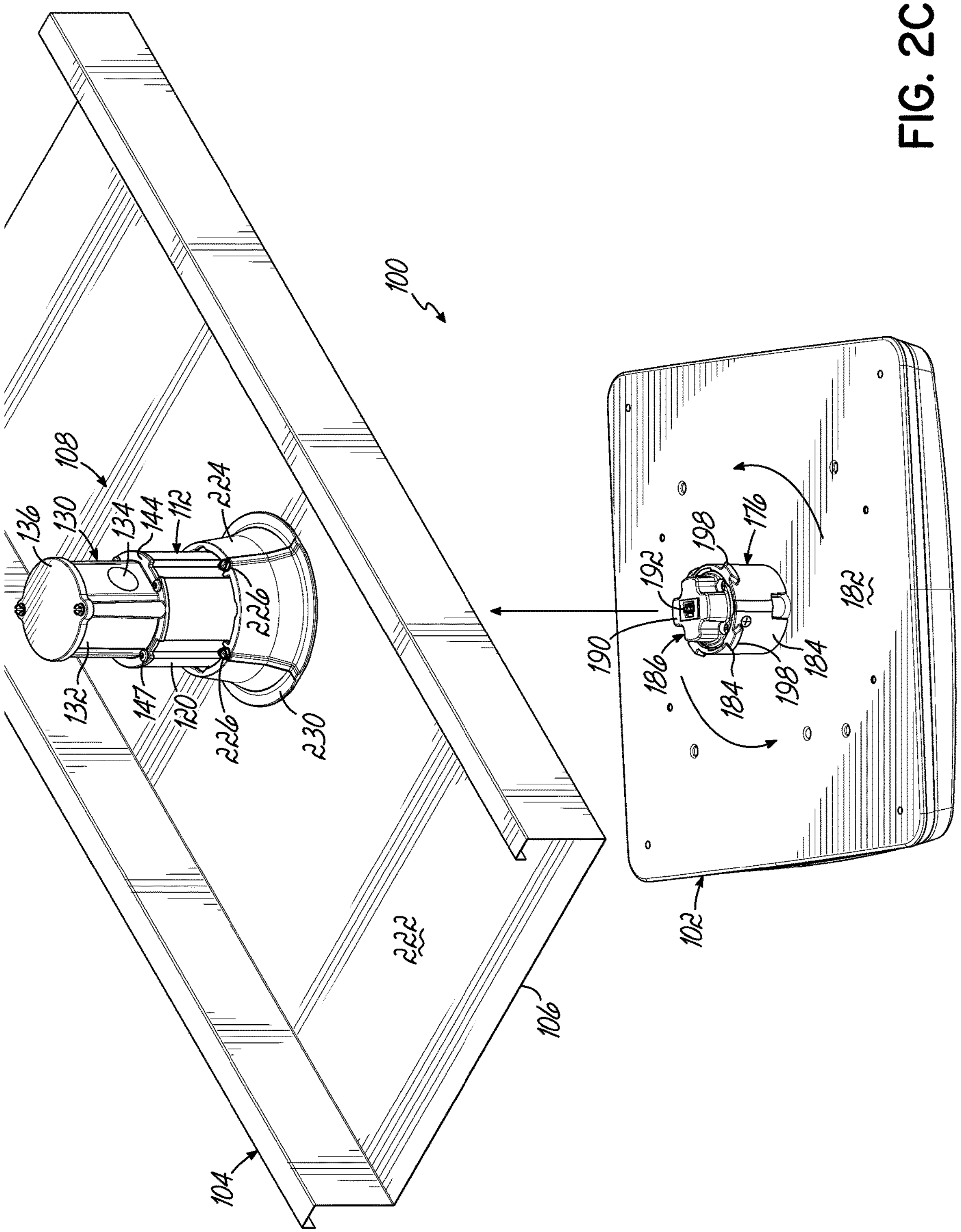
FIG. 2C is a perspective view of the canopy luminaire mounting system of FIGS. 2A and 2B for mounting the canopy luminaire to the canopy deck.

The mating connector assembly 176 includes an annular side wall 184 and a connector mount 186 (FIGS. 2A-2C) secured to the annular side wall 184 of the mating connector assembly 176 via fasteners 188 (FIG. 2C). As shown in FIGS. 2A-2C, 3A-3B and 4, a top wall 190 of the connector mount 186 supports a snap-in electrical socket 192 which is configured to be electrically connected to a mating electrical connector 194 (FIGS. 3A-3B and 5) provided on a free end of the coiled wire harness 152 which extends into the housing 112 of the canopy socket assembly 108. The snap-in socket 192 is electrically connected to internal luminaire electrical wiring 196 as shown in FIG. 3B. As will be described in greater detail below, the mating connector 194 of the coiled wire harness 152 is plugged into the snap-in socket 192 of the mating connector assembly 176 prior to mating the luminaire 102 with its mating connector assembly 176 to the canopy socket assembly 108 during installation of the canopy luminaire 102 to the canopy deck 104.

Figure 4:
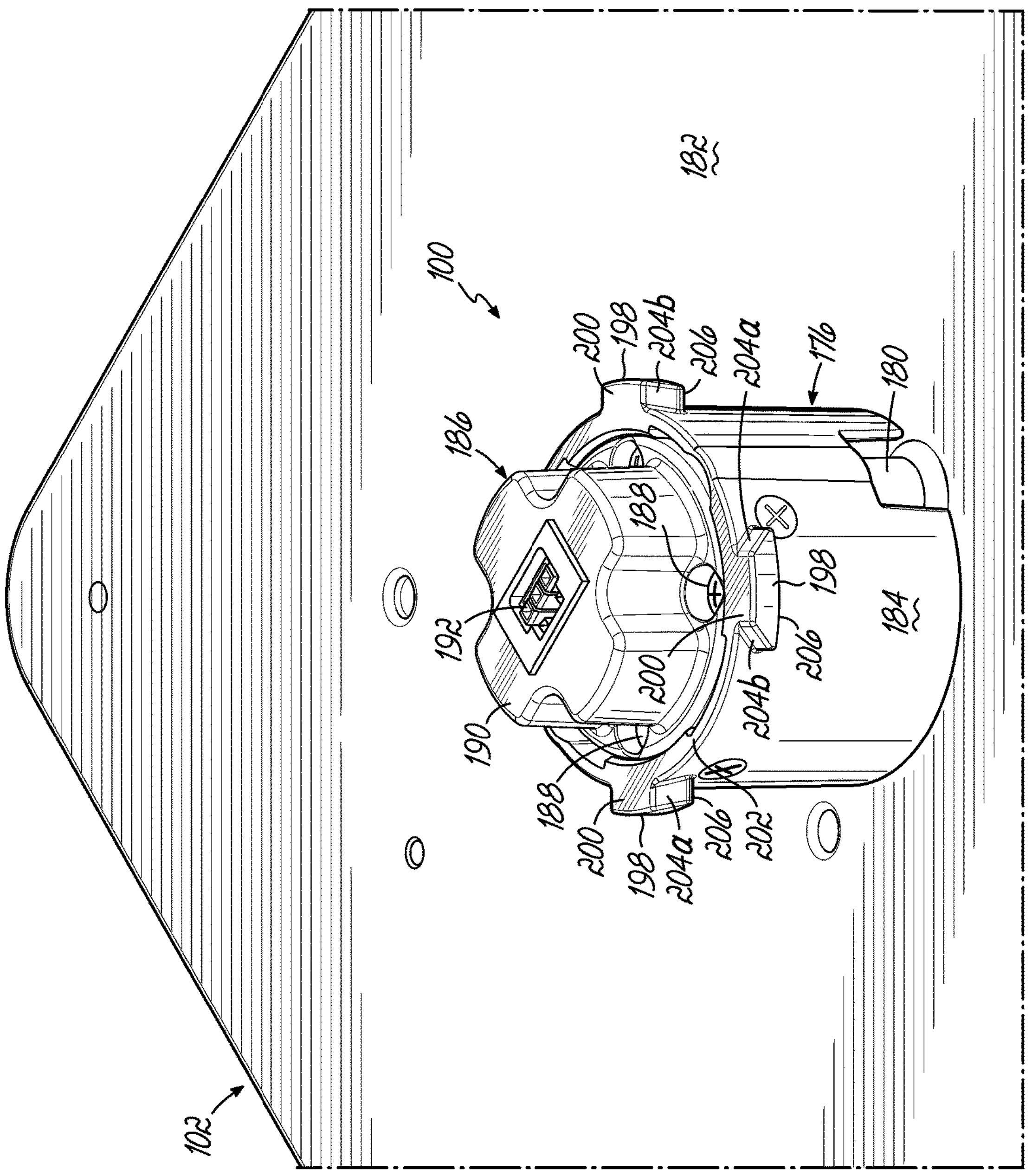
FIG. 4 is a perspective view of an exemplary mating connector assembly mounted to an upper surface of the canopy luminaire shown in FIGS. 2A-2C and 3A-3B.
Figure 5:
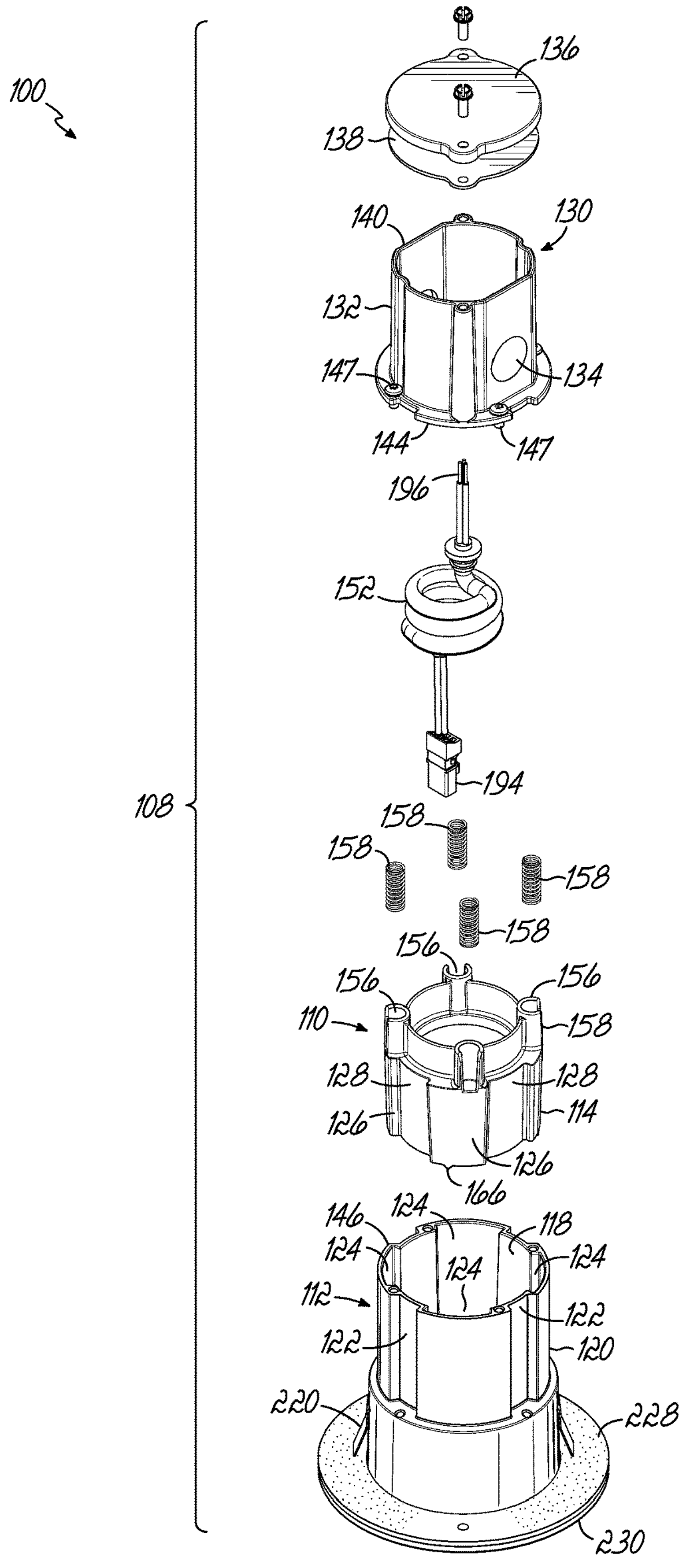
FIG. 5 is an exploded disassembled view of an exemplary canopy socket assembly as shown in FIGS. 2A-2C and 3A-3B.

Still referring now to the exemplary embodiment of FIGS. 2A-2C, 3A-3B, 4, 6A-6C and 7A-7D, the mating connector assembly 176 of the canopy luminaire 102 includes four mounting lugs 198 which extend radially outwardly from the annular side wall 184 of the mating connector assembly 176 and are circumferentially spaced about the annular side wall 184. As shown in FIGS. 3A and 4, each of the mounting lugs 198 includes a horizontal top face 200 which is coextensive with an upper annular edge 202 of the mating connector assembly 176. Each mounting lug 198 includes a pair of ramp faces 204*a*, 204*b* which extend outwardly and downwardly from respective opposite ends of the horizontal top face 200. The pair of ramp faces 204*a*, 204*b* extend from the horizontal top face 200 to opposite ends of a horizontal bottom face 206 of each mounting lug 198 as shown in the exemplary embodiment.

Figure 6A:
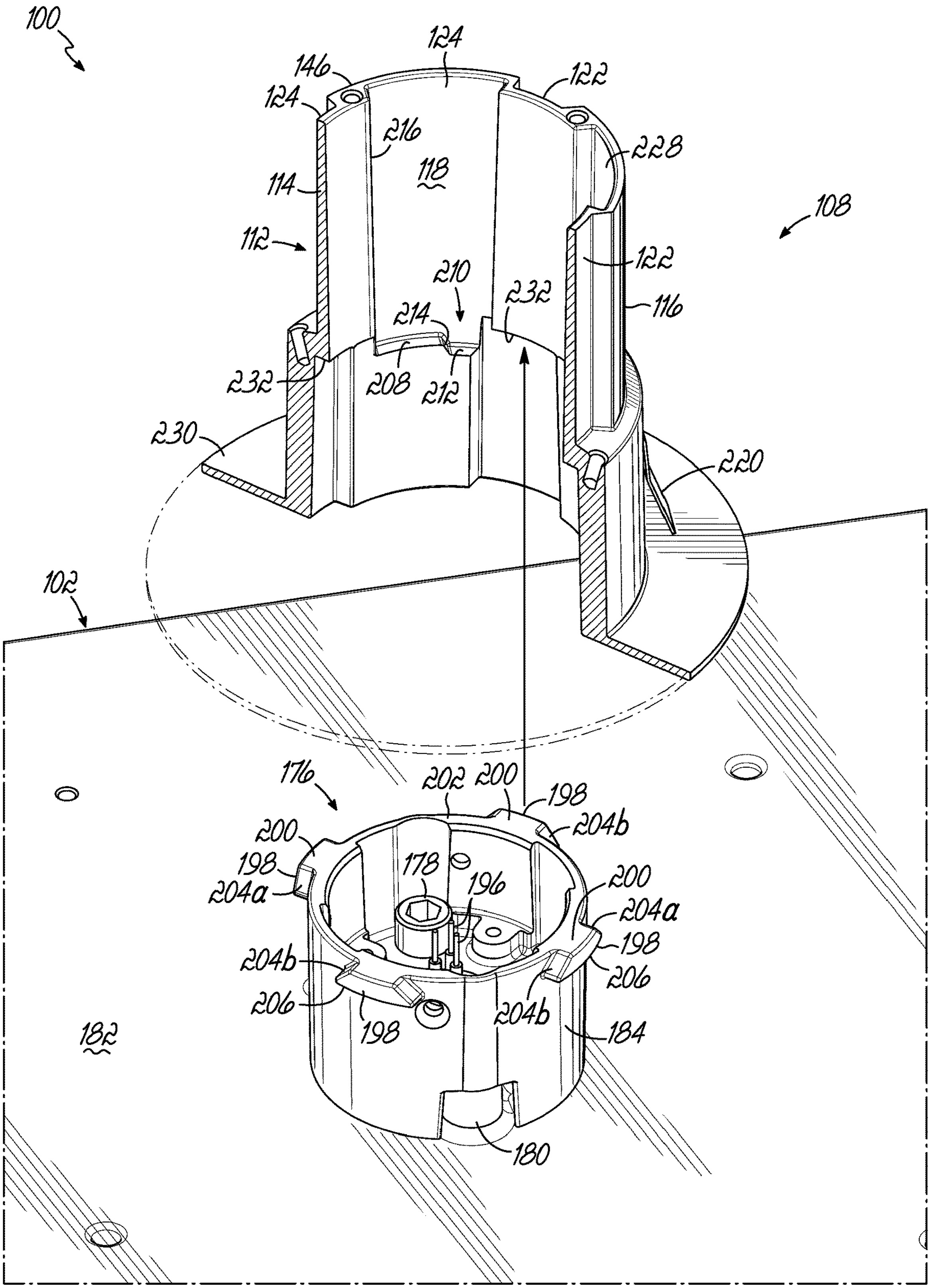
FIG. 6A-6C are perspective views, partially in cross section, showing mounting of the mating connector assembly of FIG. 4 within the canopy socket assembly of FIGS. 2A-2C, 3A-3B and 5.

Referring now to FIGS. 6A and 7A, the inner surface 118 of the housing 112 includes four horizontal ledges 208 which are spaced circumferentially about the inner surface 118 and are configured to abut the lower annular edge 168 of the plunger 110 so as to support the plunger 110 within the housing 112 when the plunger 110 is in its lowest position in response to the downward biasing force applied by the springs 158. Each horizontal ledge 208 includes a respecting notch 210 at one end of the ledge 208 which, according to one exemplary embodiment, includes a horizontal ledge 212 located at a height below the height of the horizontal ledge 208 and an inclined ramp face 214 which extends upwardly between one end of the horizontal ledge 212 and a free end of the horizontal ledge 208 as shown in FIGS. 6A and 7A. As shown in FIG. 7A, each of the horizontal ledges 208 terminates at an opposite end of the ledge 208 at a respective vertically oriented side wall 216 of each channel 124. As shown in FIG. 7B, the lower annular edge 168 of the plunger 110 rests on the four horizontal ledges 208 when the plunger 110 is in its lowest position. Each of the nibs 166 which extends downwardly from the lower annular edge 168 of the plunger 110 is positioned in a respective one of the notches 210 in the lowest position of the plunger 110 as shown in FIG. 7B.

In one embodiment, the canopy socket assembly 108 is installed through an approximate 4" canopy penetration hole 218 (FIGS. 2A and 2B) from the bottom-side 106 of the canopy deck 104. A spring-lock mechanism 220 provided on the canopy socket assembly 108 engages a topside 222 of the canopy deck 104 when the canopy socket assembly 108 is passed through the canopy penetration hole 218, thereby temporarily holding the canopy socket assembly 108 in place until installation is complete.

A locking ring 224 is connected to the canopy socket assembly 108 from the topside 222 of the canopy deck 104 so that the locking ring 224 is disposed around and encircles the canopy socket assembly 108. The locking ring 224 is attached to the canopy socket assembly 108 by mechanical means, such as fasteners 226 (FIGS. 2A-2C and 3A-3B) or any other suitable method of attachment. This creates compression of an annular gasket 228 disposed about the canopy socket assembly 108 and positioned between a radially outwardly directed annular flange 230 of the canopy socket assembly 108 and the bottom-side 106 of the canopy deck 104 to seal the penetration hole 218 in the canopy deck 104 and lock the canopy socket assembly 108 in place.

During installation of the canopy luminaire 102 to the canopy socket assembly 108 mounted to the canopy deck 104, the mating electrical connector 194 of the coiled wire harness 152 is first plugged into the snap-in socket 192 of the mating connector assembly 176 prior to mating the luminaire 102 with its mating connector assembly 196 to the canopy socket assembly 108.

Figure 6B:
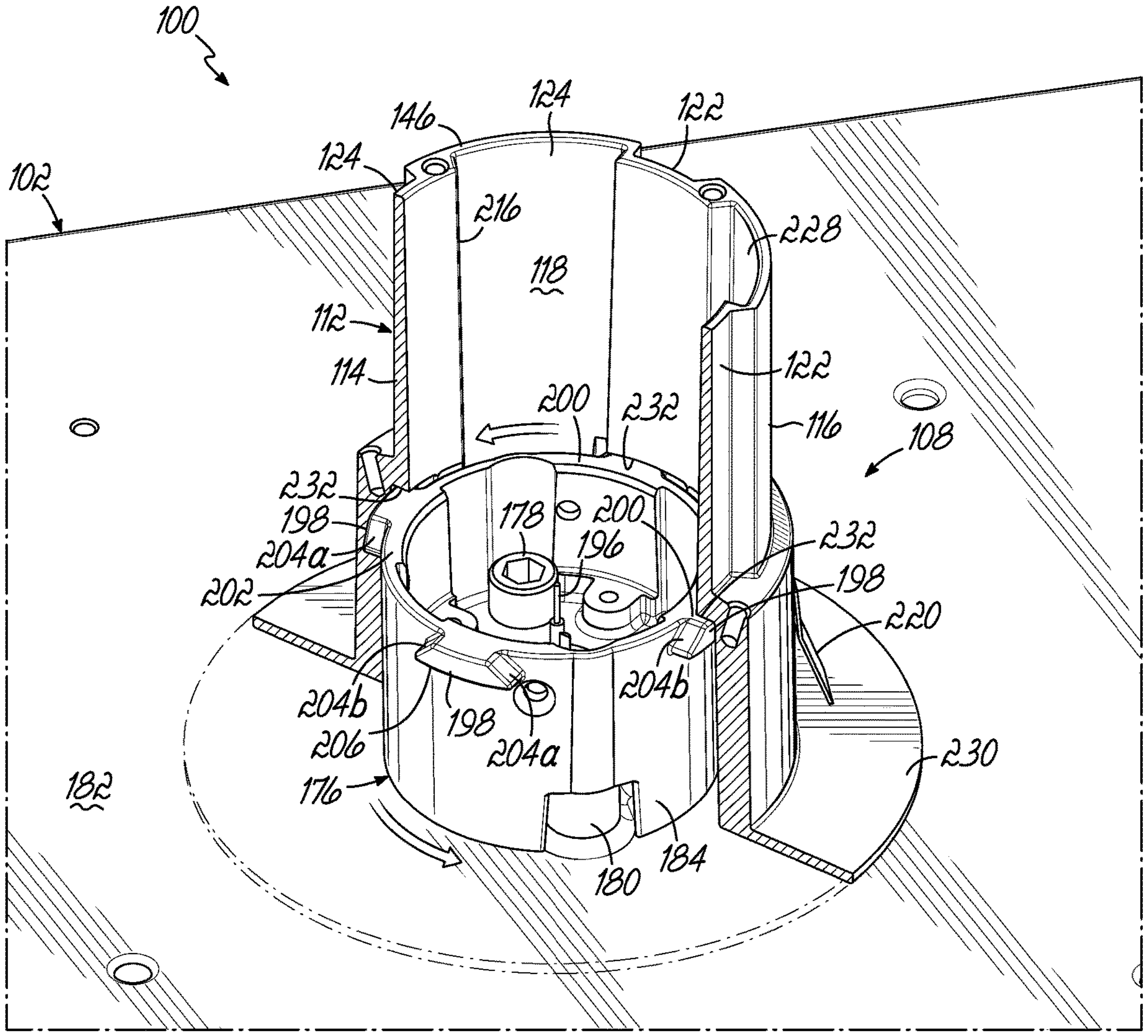
Figure 6C:
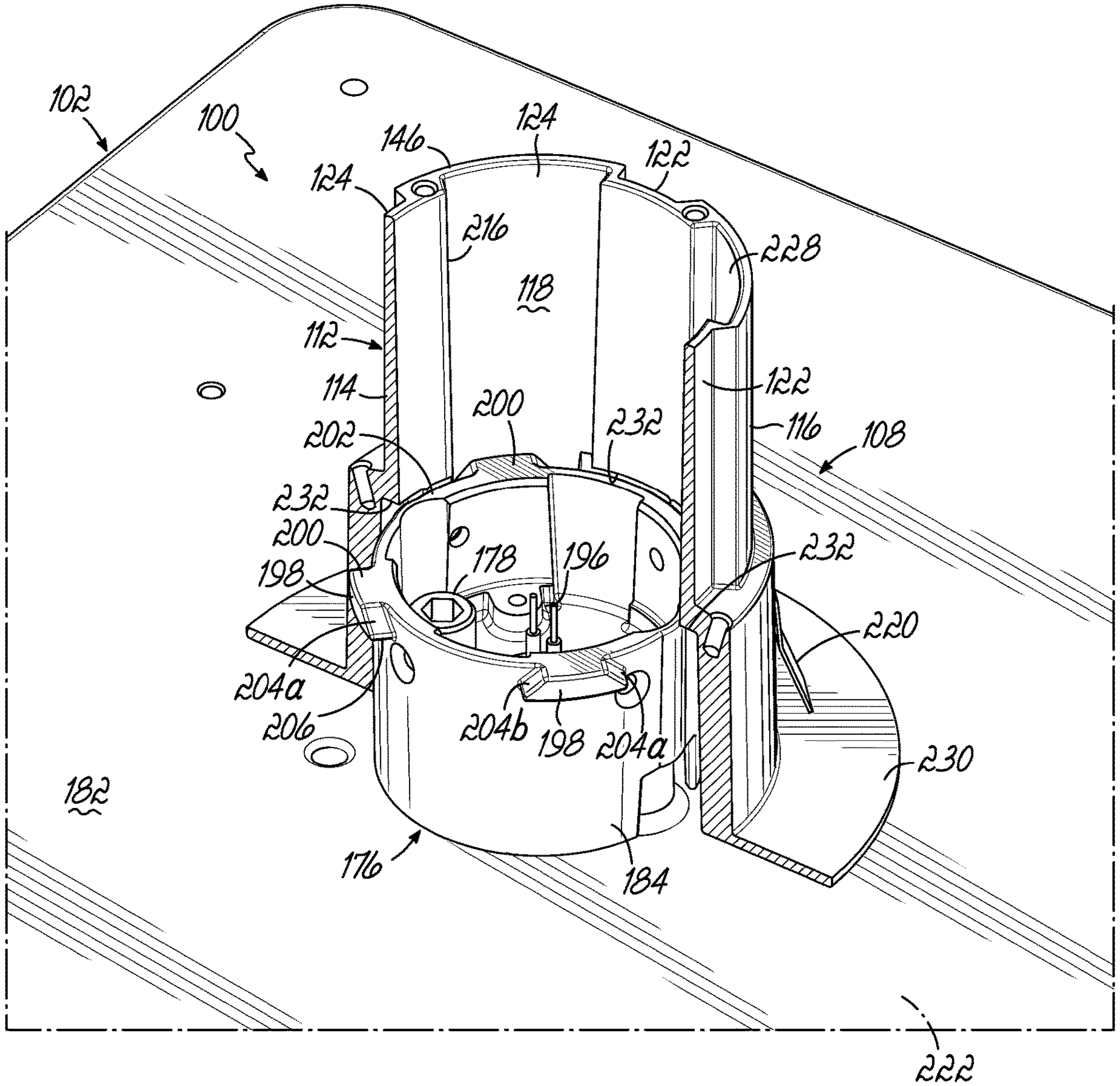

The luminaire 102, with its mating connector assembly 196, is then inserted into the canopy socket assembly 108 in one of four orientations as shown in FIGS. 20, 6A and 7B. In particular, according to one embodiment as shown in these figures, the annular side wall 120 of the housing 112 includes four circumferentially spaced and vertically oriented channels 124 which are each configured to receive a respective one of the mounting lugs 198 of the mating connector assembly 176 in four different orientations (e.g., in 90° rotational increments). The mounting lugs 198 of the mating connector assembly 176 are free to travel vertically upwardly within the respective vertical channels 124 until the upper annular edge 202 of the mating connector assembly 176 abuts lower horizontal faces 232 of the ribs 122 provided in the annular side wall 120 of the housing 112 of the canopy socket assembly 108 as shown in FIGS. 6A-6C. The lower horizontal faces 232 of the ribs 122 form stop surfaces which prevent further vertical insertion of the mating connector assembly 176 into the housing 112 of the canopy socket assembly 108.

Once the upper annular edge 202 of the mating connector assembly 176 abuts the lower horizontal faces 232 of the ribs 122, the luminaire 102 with its mating connector assembly 176 is free to be rotated relative to the canopy socket assembly 108 as shown in FIGS. 6B and 7C so that the leading ramp faces 204*a* of the mounting lugs 198 engage a confronting face 170*a* of a respective nib 166.

As the luminaire 102 and its mating connector assembly 176 are further rotated, the leading ramp faces 204*a* of the mounting lugs 198 cause the nibs 166, and thus the plunger 110, to move vertically upwardly to a raised position within the housing 112 against the bias of the springs 158 as the nibs 166 travel up the respective leading ramp faces 204*a* of the mounting lugs 198.

In response to further rotation of the luminaire 102 and its mating connector assembly 176, the nibs 166 travel across the respective horizontal top faces 200 of the mounting lugs 198 while the horizontal bottom faces 206 of the mounting lugs 198 engage the respective horizontal ledges 208 provided in the inner surface 118 of the annular side wall 120 of the housing 112 as shown in FIG. 6C.

Once enough rotation has occurred, e.g., approximately 30°, the nibs 166 travel down the trailing ramp faces 204*b* of the respective mounting lugs 198 as shown in FIG. 7D to lock the luminaire 102 in the canopy socket assembly 108 as shown FIGS. 1 and 3B. In this locked position, the plunger 110 is lowered from its temporary raised position in response to the downward force applied to the plunger 110 by the springs 158 so that the lower annular edge 168 of the plunger 110 abuts the upper annular edge 202 of the mating connector assembly 176 of the luminaire 102. Also, in this locked position, each mounting lug 198 is captured between the respective vertical side wall 216 (FIG. 7A) of a respective vertical channel 124 of the housing 112 and a respective nib 166 engaged with a trailing ramp face 204*b* of each mounting lug 198 as shown in FIG. 7D.

Now referring to FIGS. 8-11, a canopy luminaire mounting system 300 according to another exemplary embodiment is shown, where like numerals represent like parts, although not necessarily identical, to the canopy luminaire mounting system 100 of FIGS. 1-7, with corresponding similar parts numbered with a preceding numeral "3".

As described in detail below, the canopy luminaire mounting system 300 provides both mechanical means of attachment of the canopy luminaire 302 to the canopy structure or deck 304 as well as simultaneous electrical connection of the canopy luminaire 302 with electrical connections from a source of power, from the bottom-side 306 of the canopy deck 304 during installation of the canopy luminaire 302. In other words, topside access to a source of power is not required during installation of the canopy luminaire 302 to the canopy deck 304.

Figure 11A:
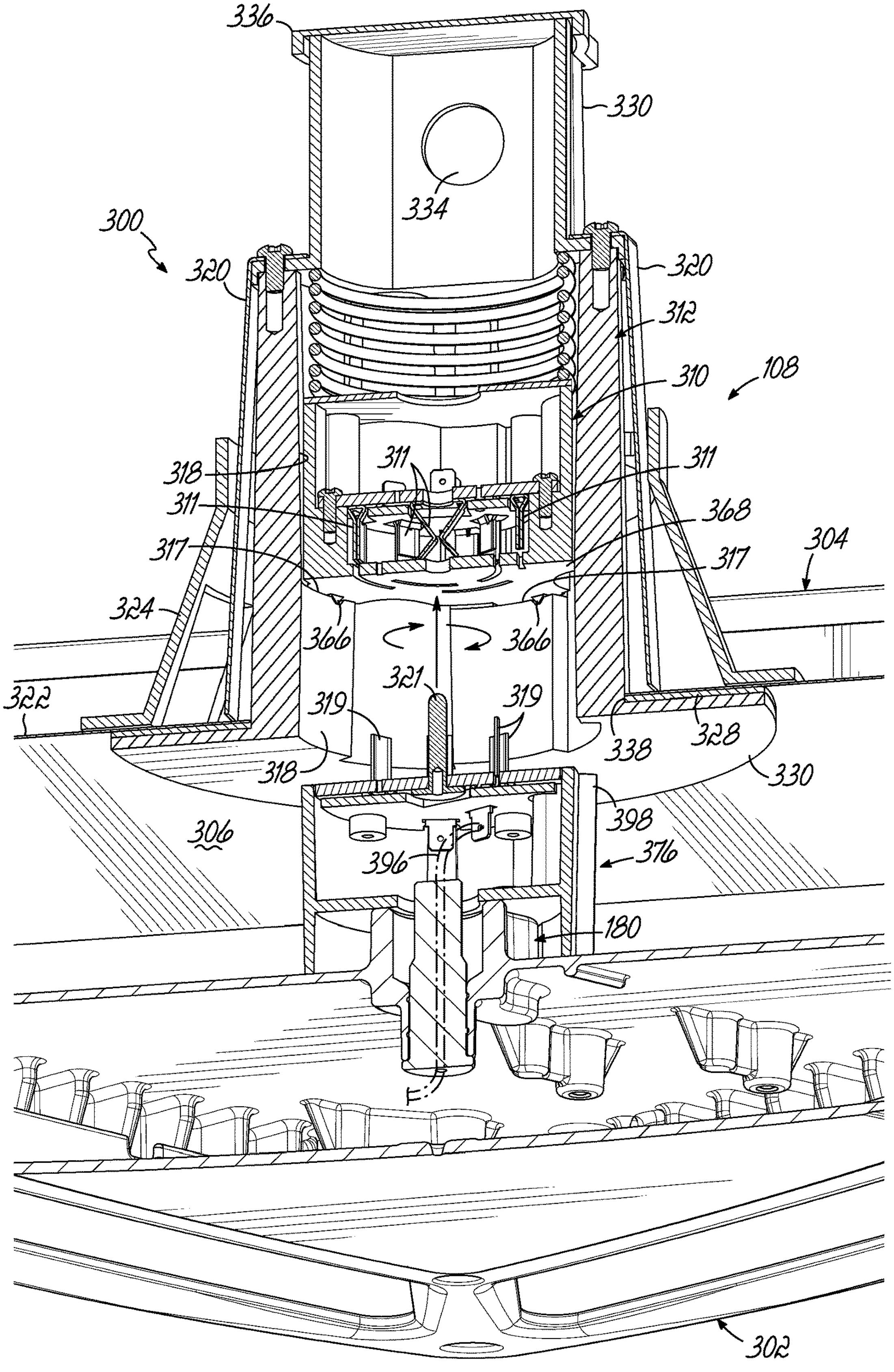
FIGS. 11A-11C are perspective views, partially in a cross section, showing mounting of the canopy luminaire shown in FIGS. 8, 9 and 10A-10B to the canopy deck.
Figure 11B:
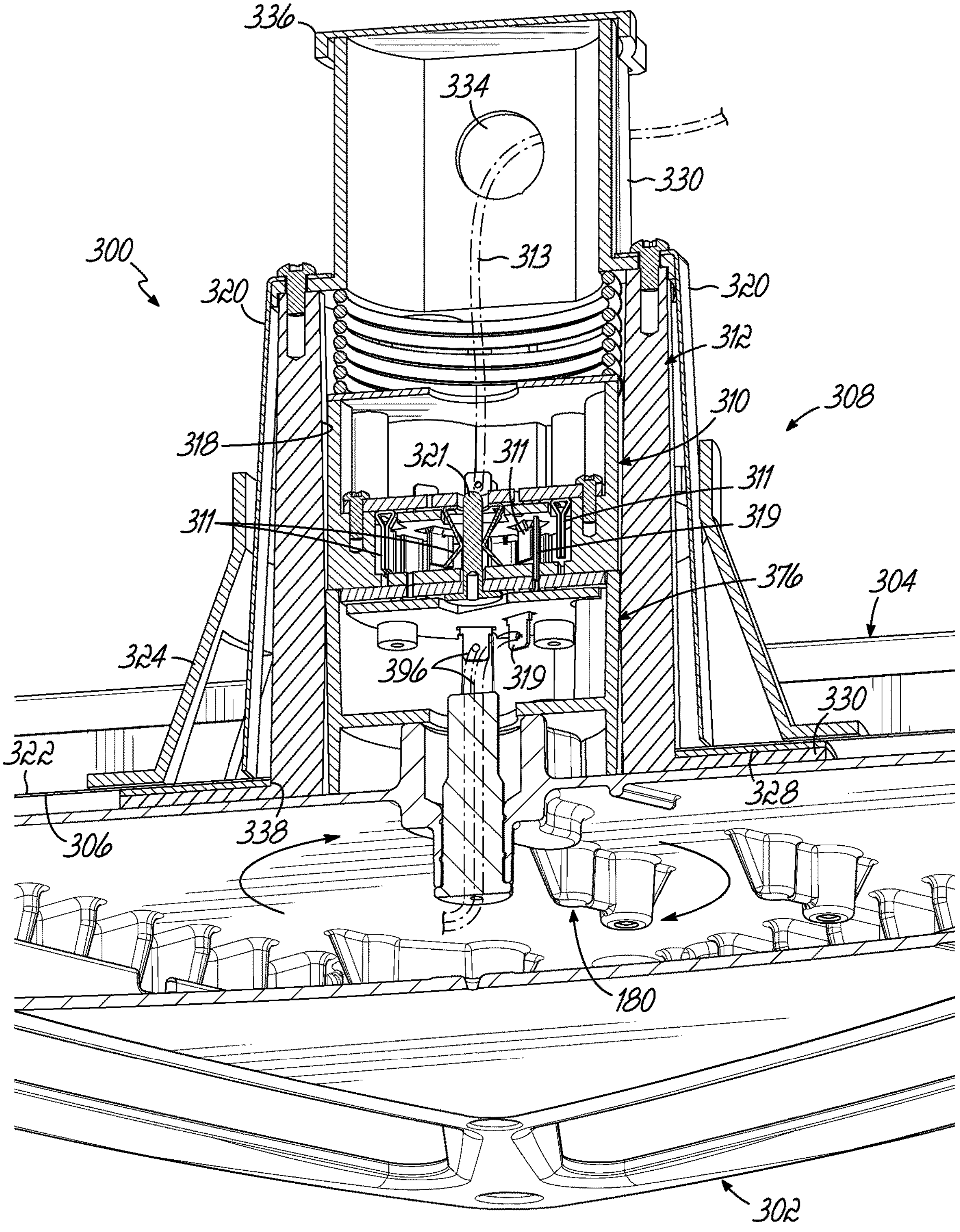

The canopy luminaire mounting system 300 comprises, in one embodiment, as shown in FIGS. 9, 10A and 11A-11C, a canopy socket assembly 308 that includes a spring-loaded electrical plunger 310 containing female electrical contacts 311 connected to primary electrical make-up conductors 313 (FIGS. 11A-11B). In addition, the canopy socket assembly 308 includes an electrical wiring enclosure or junction box 330 with one or more conduit connection points 334, as well a sealed access cover 336 for access to the interior of the electrical wiring enclosure or junction box 330 as needed as described in detail above.

Figure 8:
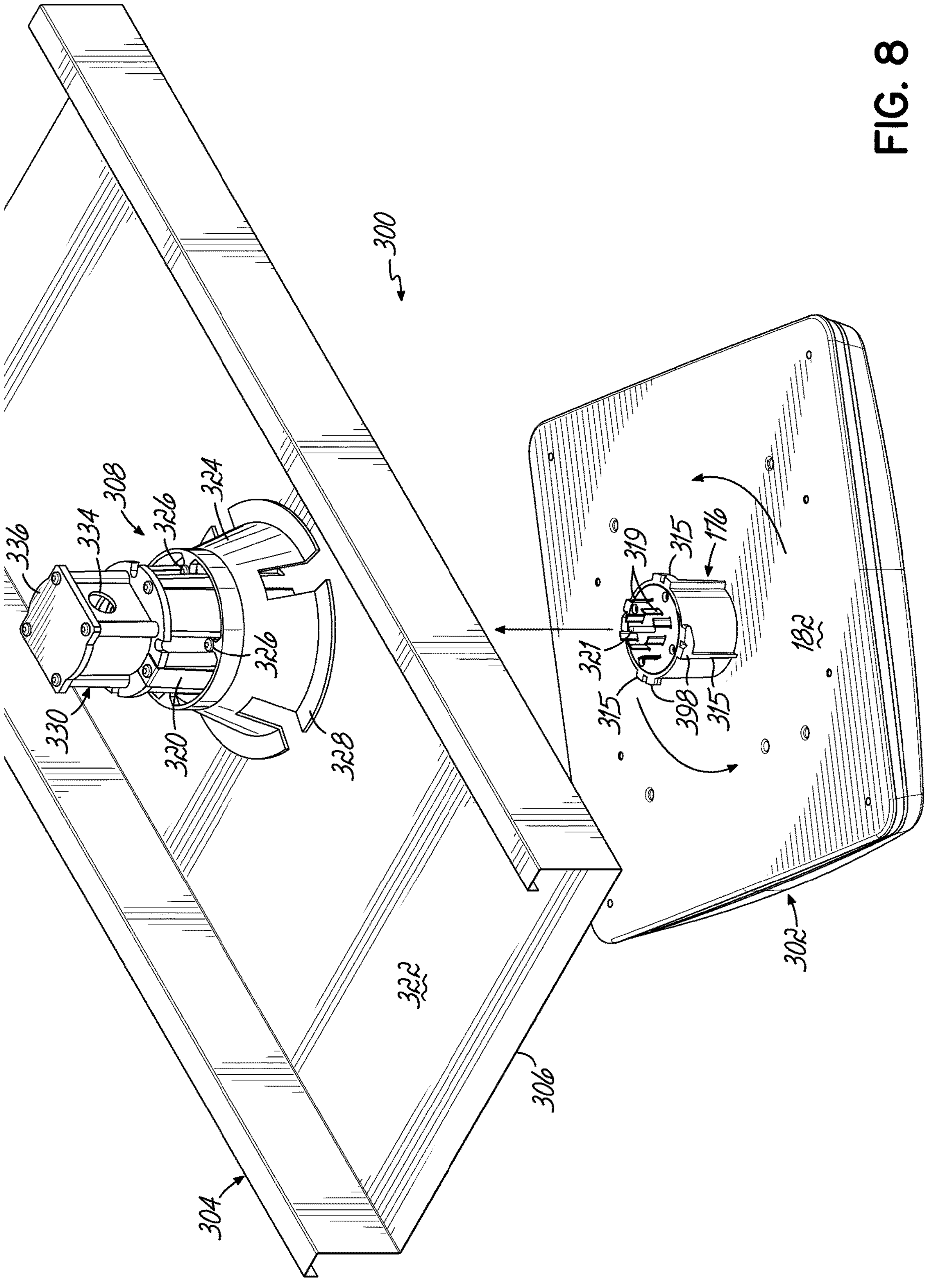
FIG. 8 is a perspective view of a canopy luminaire mounting system according to another embodiment of the present invention for mounting a canopy luminaire to a canopy deck.
Figure 9:
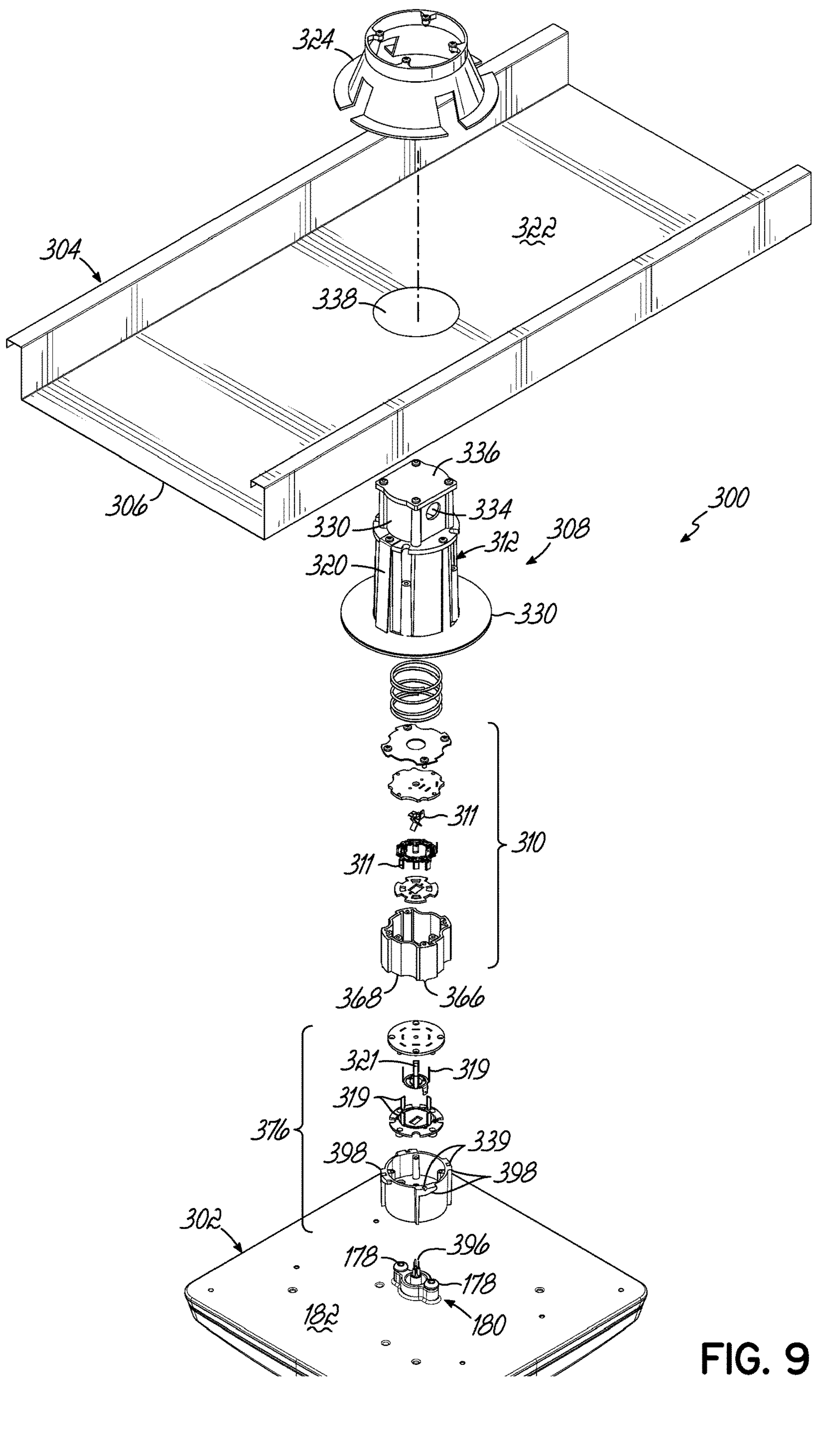
FIG. 9 is an exploded partially assembled view of the canopy luminaire mounting system of FIG. 8.
Figure 10A:
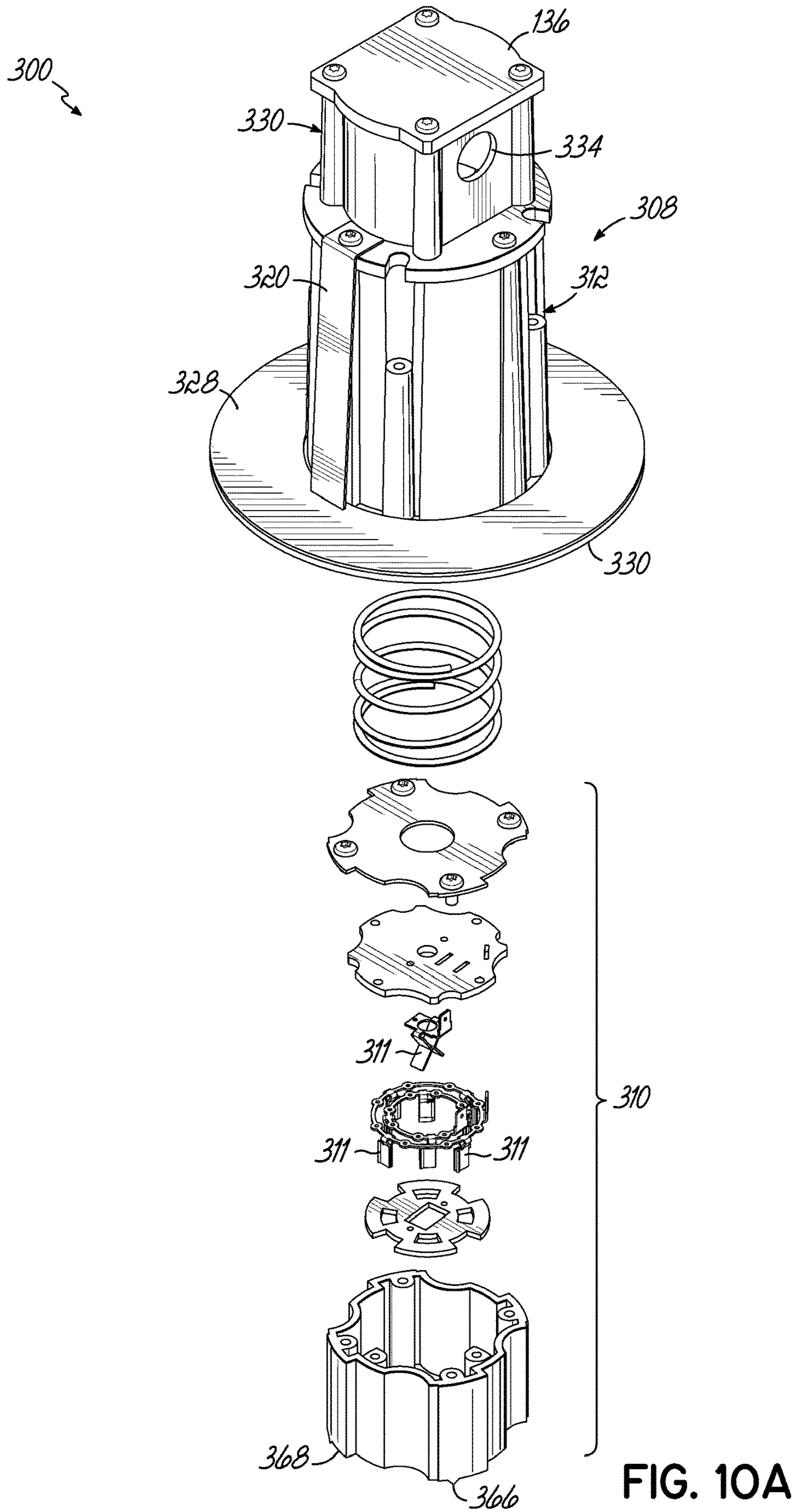
FIG. 10A is an exploded partially assembled view of an exemplary spring-loaded electrical plunger for mounting within the canopy socket assembly shown in FIGS. 8 and 9.
Figure 10B:
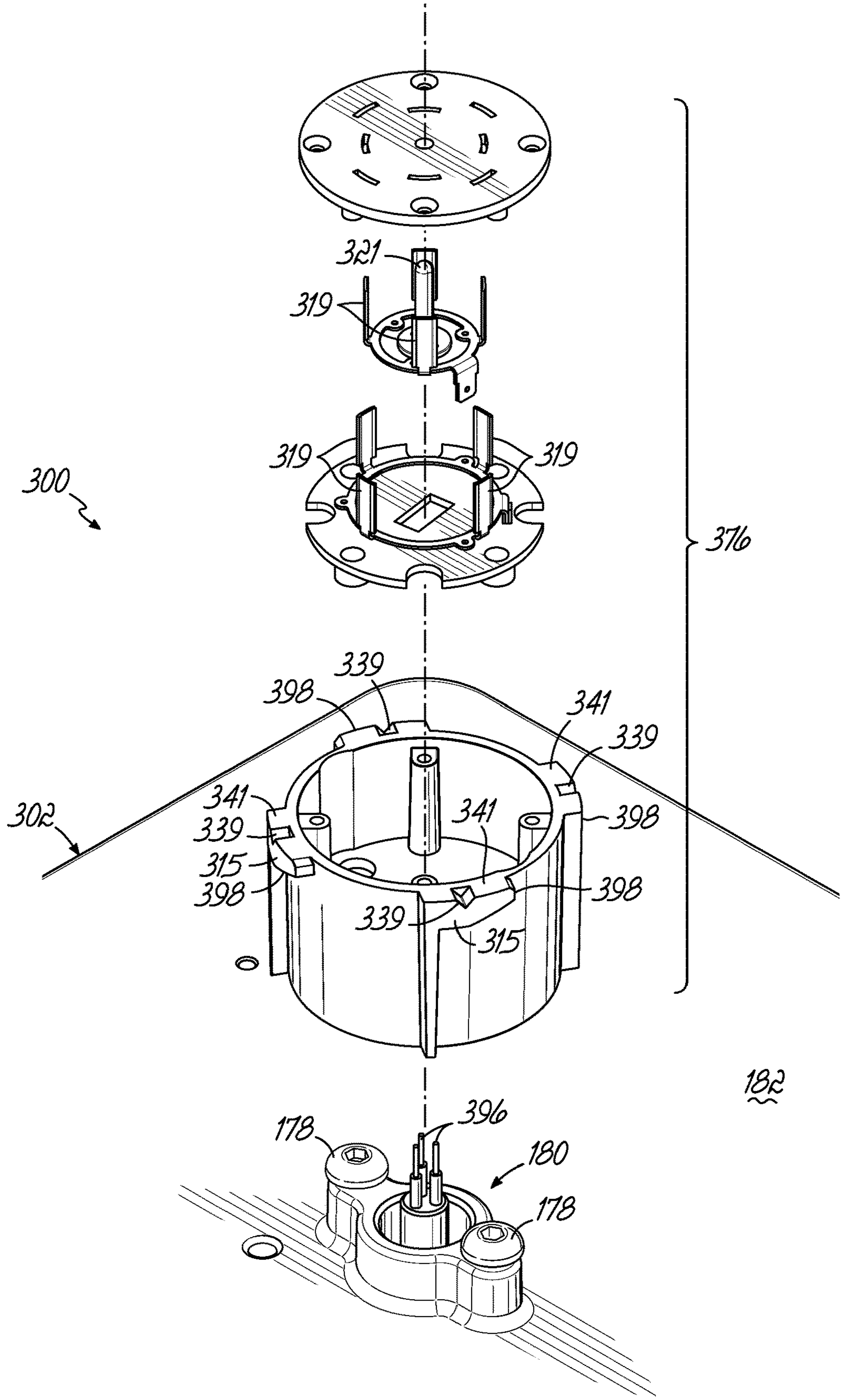
FIG. 10B is an exploded disassembled view of an exemplary mating connector assembly of the canopy luminaire mounting system shown in FIGS. 8 and 9.

As shown in FIGS. 8, 9, and 11A, a cam and follower detail 315 and 317 is provided on mounting lugs 398 of a mating connector assembly 376 of the canopy luminaire 302 and on an inner surface 318 of a housing 312 of the canopy socket assembly 308, respectively, that guides the mating connector assembly 376 of the canopy luminaire 302 into a locked position, with approximately 30° of rotation of the luminaire 302 as described in greater detail below, with the canopy socket assembly 376, thereby making the necessary electrical connections between the female electrical contacts 311 of the spring-loaded electrical plunger 310 and male electrical contacts 319 provided on a connector mount 386 secured in the mating connector assembly 376 of the canopy luminaire 302.

The electrical plunger 310 is keyed to the inner surface 318 of the housing 312 of the canopy socket assembly 308 to prevent rotation of the electrical plunger 310 within the housing 312 during vertical movement of the electrical plunger 310 as described in detail below.

Figure 11C:
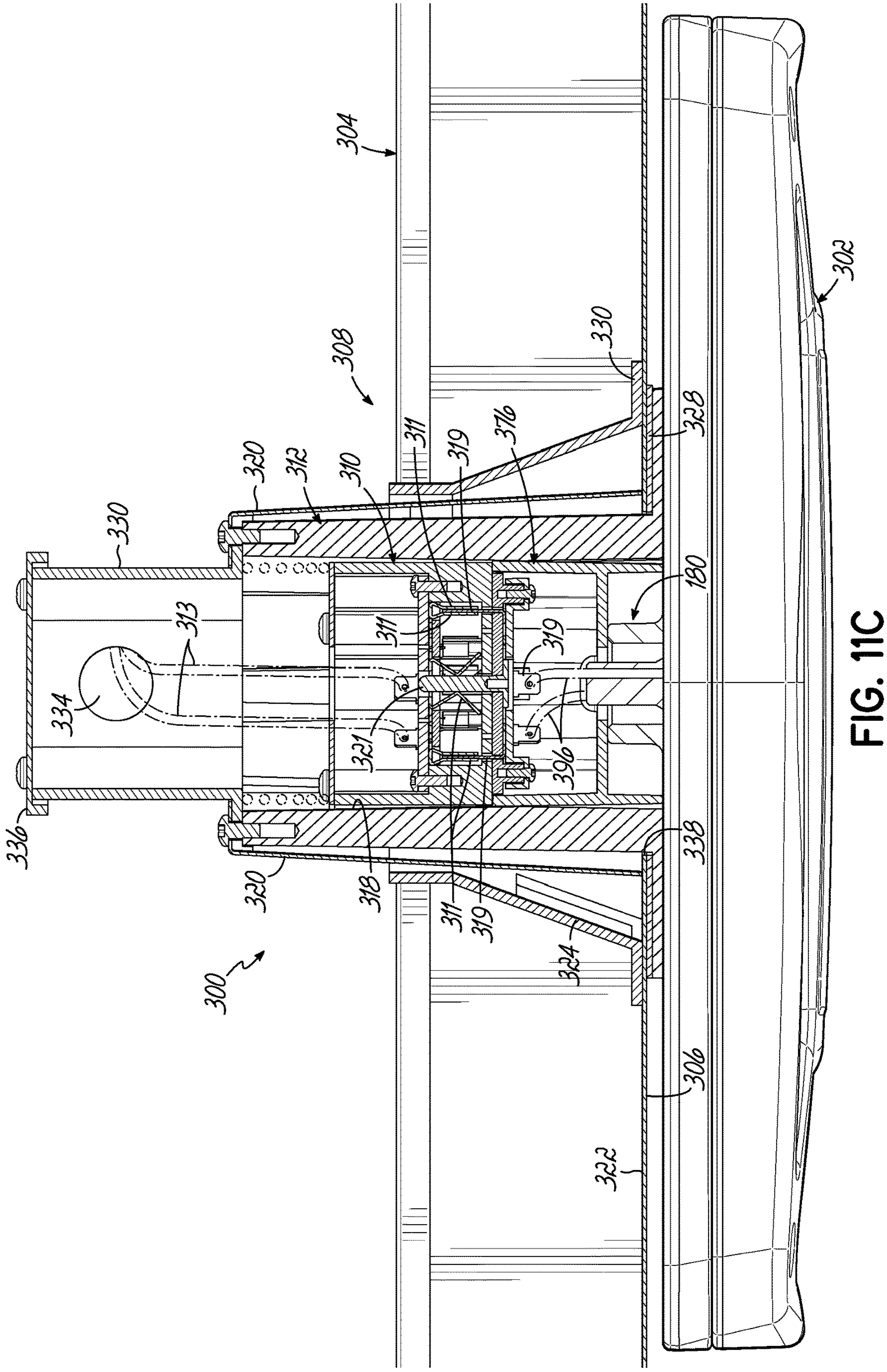

As shown in FIGS. 11A-11C, the female electrical contacts 311 of the spring-loaded electrical plunger 310 have openings allowing the male electrical contacts 319 of the mating connector assembly 376 to pass through and rotate during installation of the canopy luminaire 302 to establish the necessary electrical connections of the luminaire 302 with the canopy socket assembly 308.

As described above in connection with the canopy luminaire mounting system 100 of FIGS. 1-7, the canopy socket assembly 308 is installed through an approximate 4" canopy penetration hole 338 (FIG. 9) from the bottom-side 306 of the canopy deck 304. A spring-lock mechanism 320 provided on the canopy socket assembly 308 engages a topside 322 of the canopy deck 304 when the canopy socket assembly 308 is passed through the canopy penetration hole 338, thereby temporarily holding the canopy socket assembly 308 in place until installation is complete.

A locking ring 324 is assembled around the canopy socket assembly 308 from the topside 322 of the canopy deck 304. The locking ring 324 is attached to the canopy socket assembly 308 by mechanical means, such as fasteners 326 (FIG. 8) or any other suitable method of attachment. This creates compression of a gasket 328 located between a radially outwardly directed annular flange 330 of the canopy socket assembly 308 and the bottom-side 306 of the canopy deck 304 to seal the penetration hole 338 in the canopy deck 304 and lock the canopy socket assembly 308 in place.

The male electrical contacts 319 of the mating connector assembly 376 are electrically connected to internal luminaire electrical wiring 396 (FIG. 10B) connected to the luminaire 302. Included in the male electrical contacts 319 of the mating connector assembly 376 is a center grounding pin 321. The mating connector assembly 376 is keyed to mate into the canopy socket assembly 308 in four orientations 90° rotationally apart.

During installation of the canopy luminaire 302 to the canopy socket assembly 308 mounted to the canopy deck 304, the luminaire 302, with its mating connector assembly 376, is mated to the canopy socket assembly 308 in one of four orientations. As shown in FIGS. 11A-11C, rotating the luminaire 302 relative to the canopy socket assembly 308 engages the cam/follower features 315 and 317 described above that "pull" the luminaire 302 toward the canopy socket assembly 308 during rotation of the luminaire 302, while the male and female electrical contacts 319 and 311, respectively, on both the luminaire mating connector assembly 376 and the electrical plunger 310 simultaneously engage to establish an electrical connection therebetween. Once enough rotation of the luminaire 302 has occurred, e.g., approximately 30°, nibs 366 (FIGS. 10A and 11A) provided on a lower annular edge 368 of the spring-loaded electrical plunger 310 located in the canopy socket assembly 308 engage detent features 339 (FIG. 10B) provided on upper horizontal faces 341 of mounting lugs 398 provided on the mating connector assembly 376, thereby inhibiting the luminaire 302 from further rotation and locking it in place relative to the canopy deck 304 as shown in FIG. 11C.

The female electrical terminals 311 of the spring-loaded electrical plunger 310 that mate with the male electrical contacts 319 contained on the connector mount 386 of the mating connector assembly 376 are insulated within the electrical plunger 310 that is located within the canopy socket assembly 308. The insulation is achieved using an insulating composite polymer material. In addition, the spring-loaded electrical plunger 310 design is such that the electrically live components within the electrical plunger 310 are touch safe, similar to a traditional wall outlet plug. Because of this, the luminaire 302 with the mating connector assembly 376 can be uninstalled while the canopy socket assembly 308 mounted to the canopy structure 304 remains electrically live. The present invention removes the requirement to access the topside 322 of the canopy structure 304 to disconnect the electrical service so that the luminaire 302 can be removed for maintenance and/or replacement.

Figure 12:
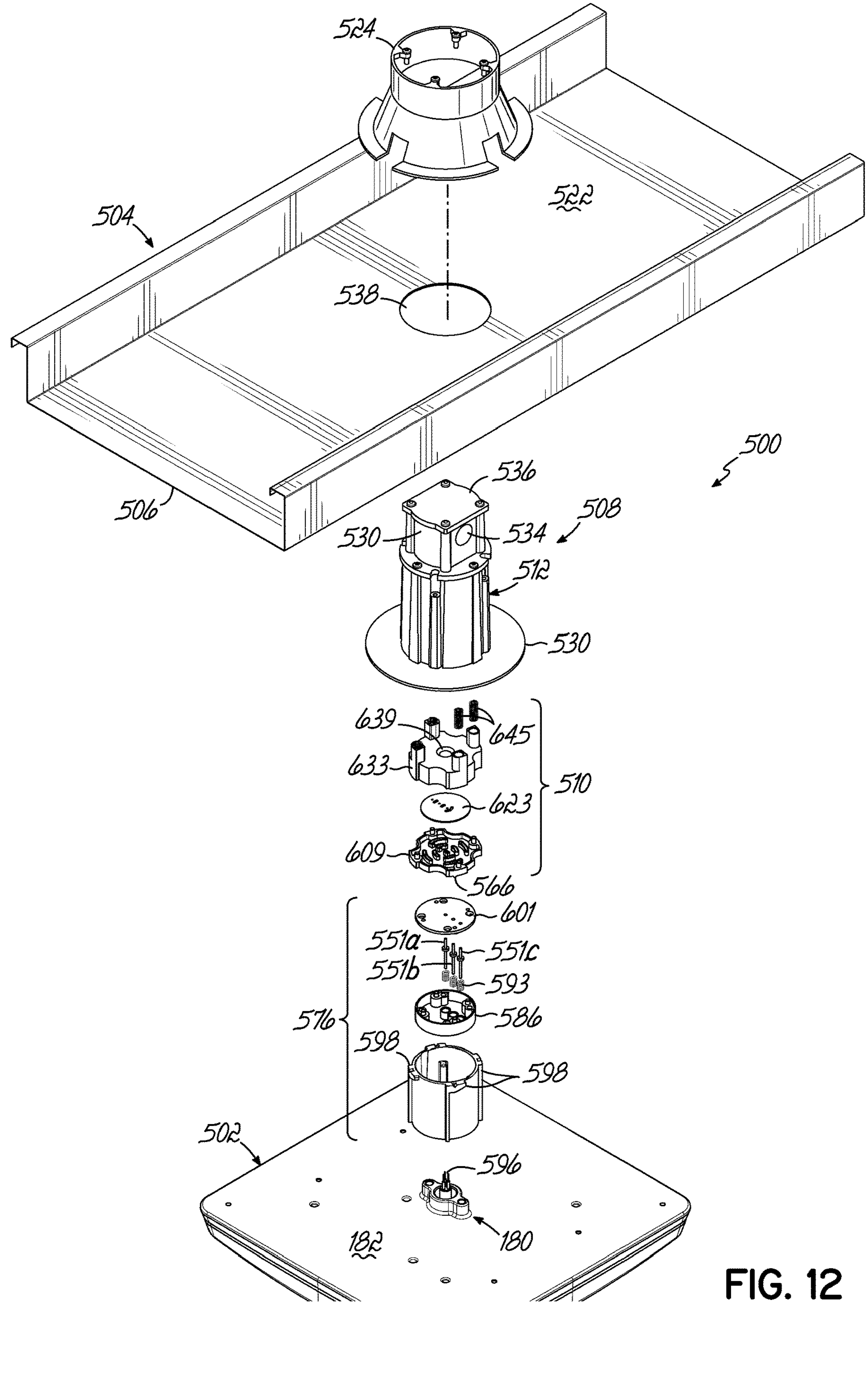
FIG. 12 is an exploded partially assembled view of a canopy luminaire mounting system according to yet another embodiment of the present invention for mounting a canopy luminaire to a canopy deck.

According to another exemplary embodiment of the present invention as shown in FIGS. 12-14, a canopy luminaire mounting system 500 is provided, where like numerals represent like parts, although not necessarily identical, to the canopy luminaire mounting system 100 of FIGS. 1-7 and the canopy mounting system 300 of FIGS. 8-11, with corresponding similar parts numbered with a preceding numeral "5".

Similar to the canopy luminaire mounting system 300 of FIGS. 8-11, the canopy luminaire mounting system 500 of this exemplary embodiment provides both mechanical means of attachment of the canopy luminaire 502 to the canopy structure or deck 504 as well as simultaneous electrical connection of the canopy luminaire 502 with electrical connections from a source of power, from the bottom-side 506 of the canopy deck 504 during installation of the canopy luminaire 502. In other words, topside access to a source of power is not required during installation of the canopy luminaire 502 to the canopy deck 504.

In this embodiment, a luminaire 502 is provided having a mating connector assembly 576 which includes three spring-loaded connector pins 551*a*-551*c* (FIGS. 12A, 13A and 14A-14B) which provide electrical connection of the luminaire 502 with a canopy socket assembly 508 mounted to a canopy deck 504 in a manner as described in detail below.

While not shown, the canopy luminaire mounting system of this embodiment also includes a spring-lock mechanism provided on the canopy socket assembly 508 for temporarily holding the canopy socket assembly in place until installation is complete.

Figure 14A:
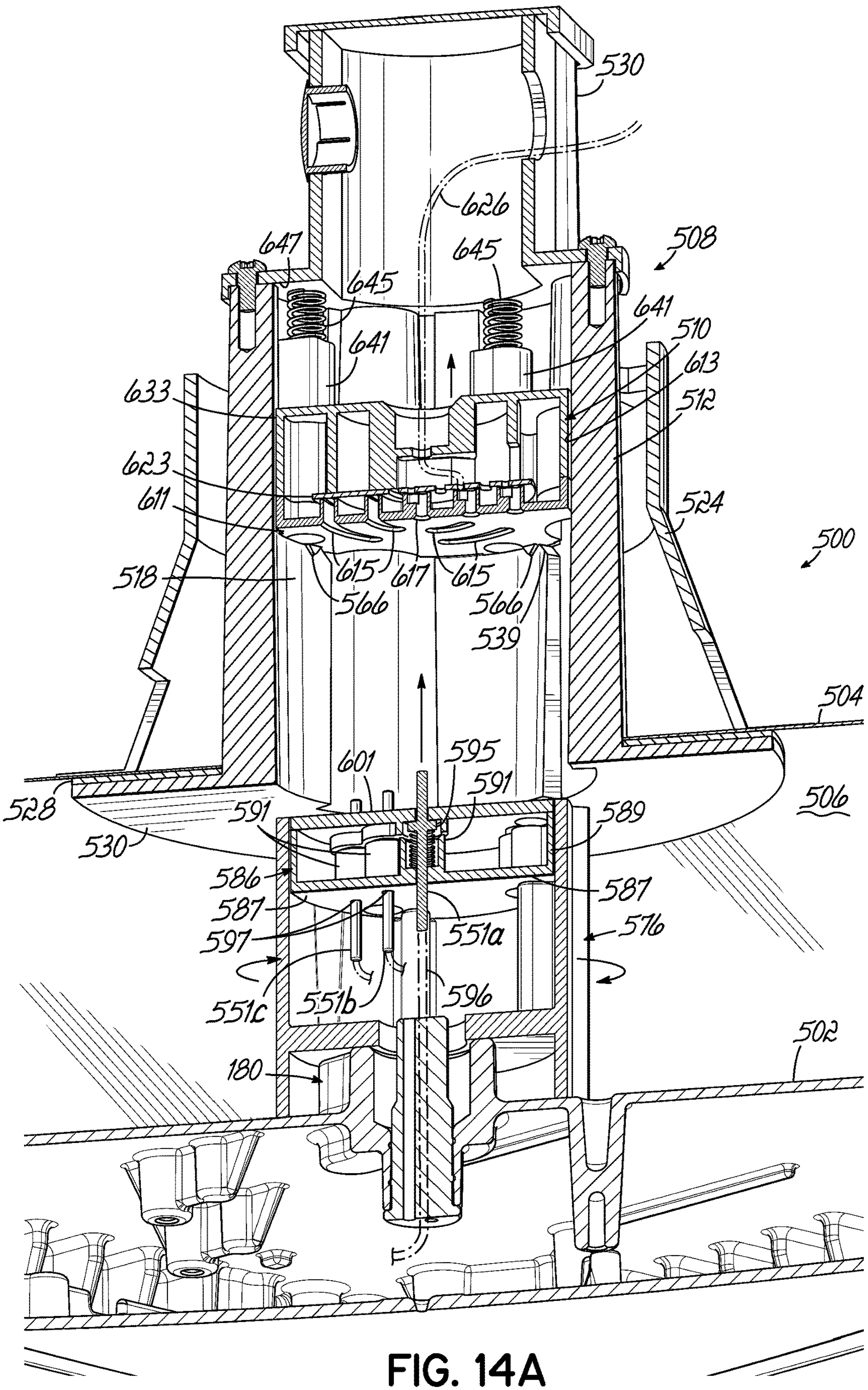
FIGS. 14A-14B are respective views, in cross section, showing mounting of the canopy luminaire shown in FIG. 12 to the canopy deck.
Figure 14B:
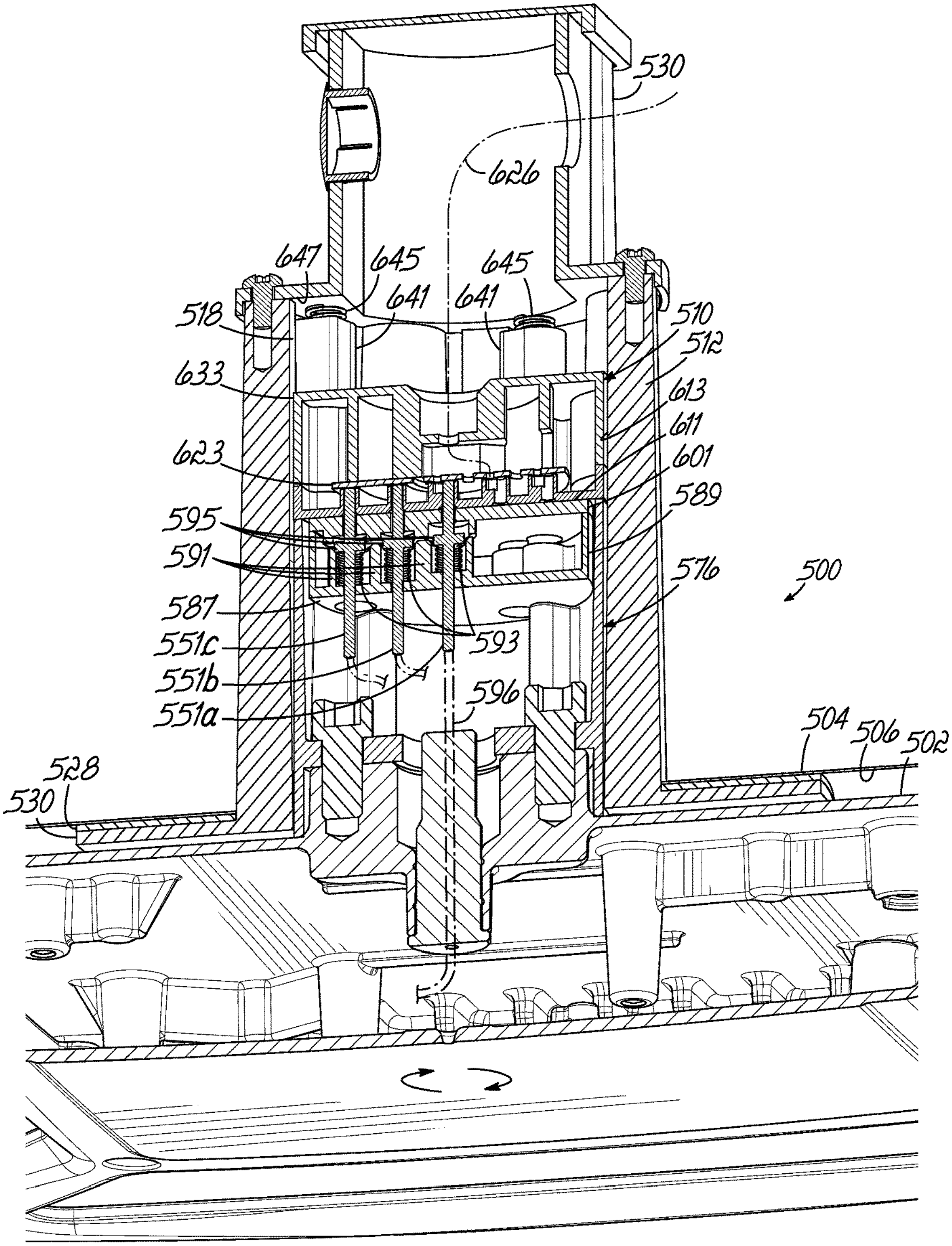
Figure 15:
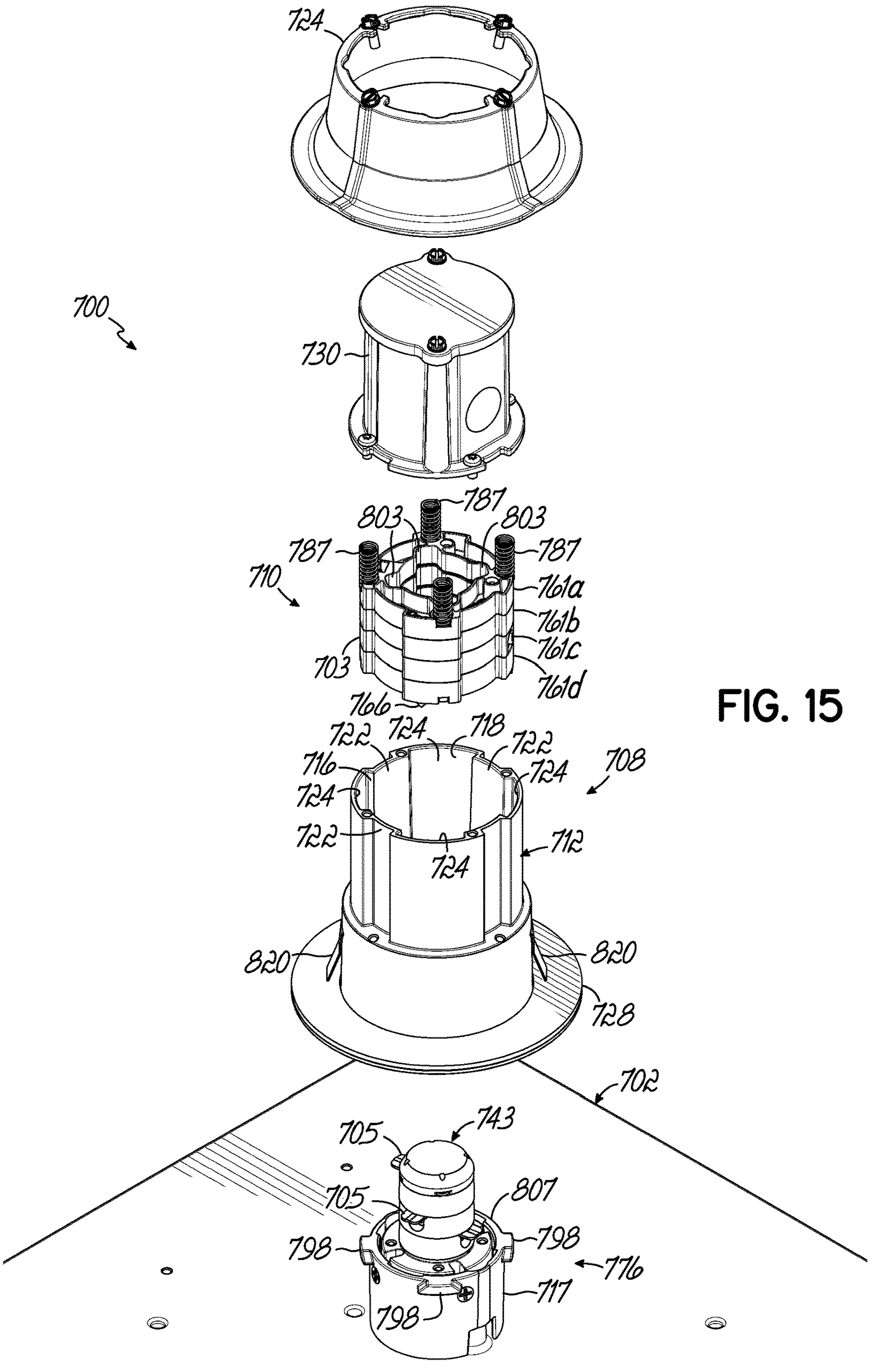
FIG. 15 is an exploded disassembled view of a canopy luminaire mounting system according to still yet another embodiment of the present invention for mounting a canopy luminaire to a canopy deck.

A locking ring 524 is assembled around the canopy socket assembly 508 to compress the gasket 528 located between the flange 530 of the canopy socket assembly 508 and the bottom-side 506 of the canopy deck 504 as described above in connection with the previous embodiments (FIGS. 14A-14B).

Figure 13A:
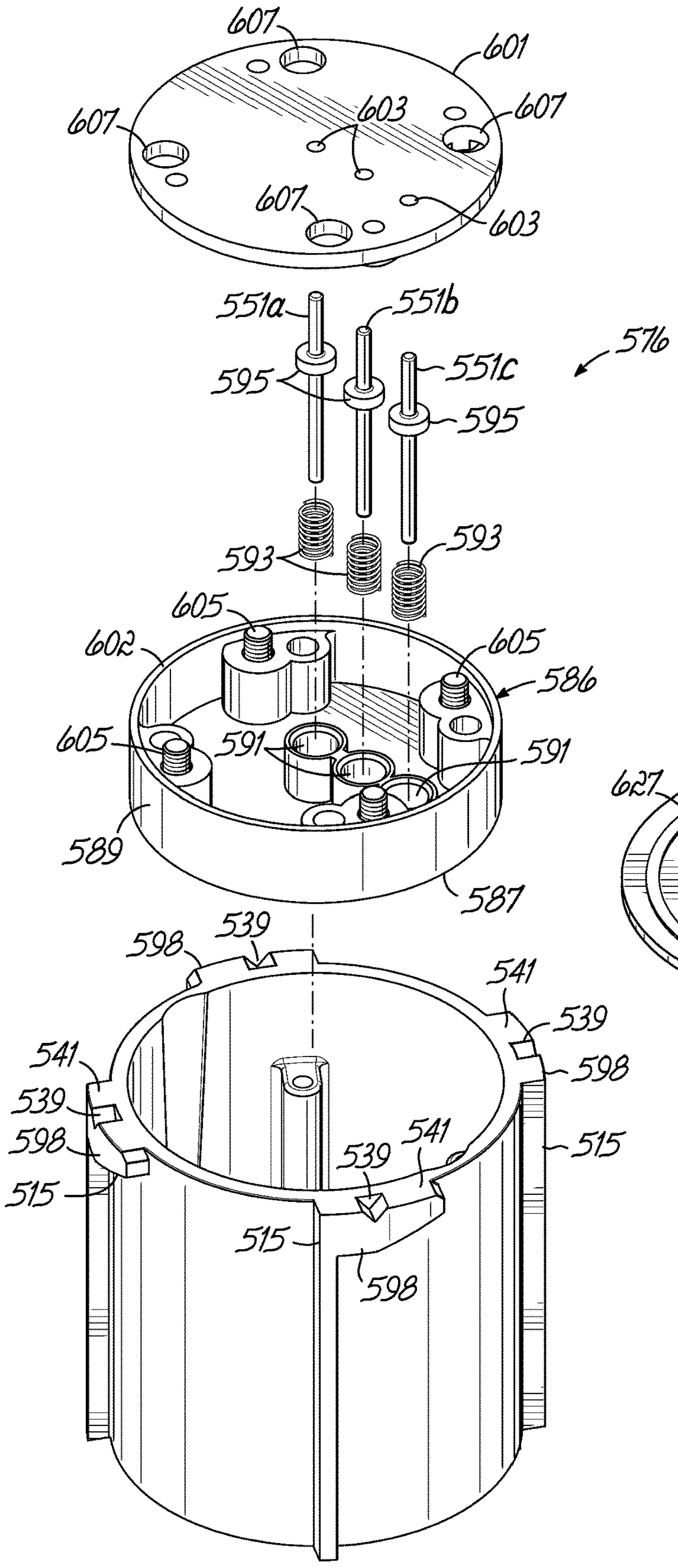
FIG. 13A is an exploded disassembled view of an exemplary mating connector assembly of the canopy luminaire mounting system shown in FIG. 12.

As shown in FIGS. 12, 13A and 14A-14B, the mating connector assembly 576 includes a cup-shaped connector mount 586 secured to the mating connector assembly 576 via suitable fasteners (not shown). The connector mount 586 includes a bottom wall 587 and an annular side wall 589 extending upwardly from the bottom wall 587. Three annular spring seats 591 extend upwardly from the bottom wall 587 that are each configured to receive and support a respective compression spring 593 and a connector pin 595 which at least partially extends through each spring 593. In one embodiment, the three spring seats 591 are aligned along a common radius of the connector mount 586 as shown in FIG. 13A.

As shown in FIGS. 12, 13A and 14A-14B, the connector pins 551*a*-551*c* are elongated and include radially outwardly directed collars 595 that capture the springs 593 between the respective collars 595 and a bottom wall (not shown) of the respective spring seats 591, with lower portions of connector pins 551*a*-551*c* extending downwardly from the bottom wall 587 of the connector mount 586 through apertures 597 formed through the bottom wall 587 (FIGS. 14A-14B). The lower portions of the connector pins 551*a*-551*c* which extend below the bottom wall 587 of the connector mount 586 are electrically connected to internal luminaire electrical wiring 596 as shown in FIGS. 14A-14B. The compression springs 593 bias the connector pins 551*a*-551*c* upwardly relative to the respective spring seats 591 as shown in FIG. 14A.

Further referring to FIGS. 12, 13A and 14A-14B, the connector mount 586 includes a cover 601 that is secured to an upper annular edge 602 of the connector mount 586 via suitable fasteners (not shown). The cover 601 includes three apertures 603 that receive a respective upper portion of each connector pin 551*a*-551*c* therethrough, e.g., an upper portion of the respective connector pins 551*a*-551*c* located above the respective collars 595. The three apertures 603 are in vertical registry with the three spring seats 591 when the cover 601 is secured to the connector mount 586. As shown in FIG. 13A, the connector mount 586 includes four upwardly extending fasteners 605 which are received in respective apertures 607 provided in the cover 601. In this way, proper alignment and securement of the cover 601 relative to the connector mount 586 is assured.

As shown in FIGS. 14A-14B, an upper portion of each connector pin 551*a*-551*c* extends upwardly beyond the cover 601. The cover 601 limits upward vertical movement of the connector pins 551*a*-551*c* relative to the spring seats 591 by engaging the collars 595 of the connector pins 551*a*-551*c* which are biased upwardly by the springs 593 as shown in FIG. 14A.

Similar to the canopy luminaire mounting system 300 of FIGS. 8-11, a cam and follower detail 515 and 517 is provided on mounting lugs 598 of the mating connector assembly 576 of the canopy luminaire 502 and on an inner surface 518 of a housing 512 of the canopy socket assembly 508, respectively, that guides the mating connector assembly 576 of the canopy luminaire 502 into a locked position, with approximately 30° of rotation of the luminaire 502, as described in greater detail below.

As shown in FIGS. 12, 13B and 14A-14B, a spring-loaded electrical plunger 510 is mounted within the housing 512 of the canopy socket assembly 508. The electrical plunger 510 is keyed to an inner surface 518 of the housing 512 of the canopy socket assembly 508 to prevent rotation of the electrical plunger 510 within the housing 512 during vertical movement of the electrical plunger 510 as described in detail below.

Figure 13C:
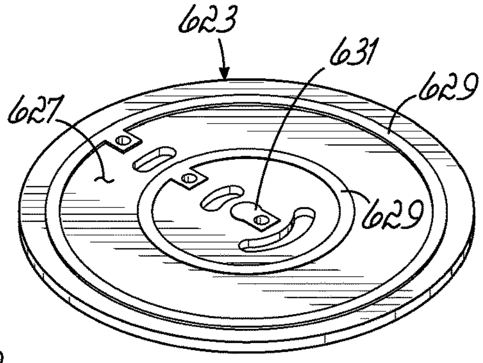
FIG. 13C is a bottom perspective view of a printed circuit board having circular and concentric electrical traces and a central electric pad for mounting within the spring-loaded electrical plunger of FIG. 13B.
Figure 13B:
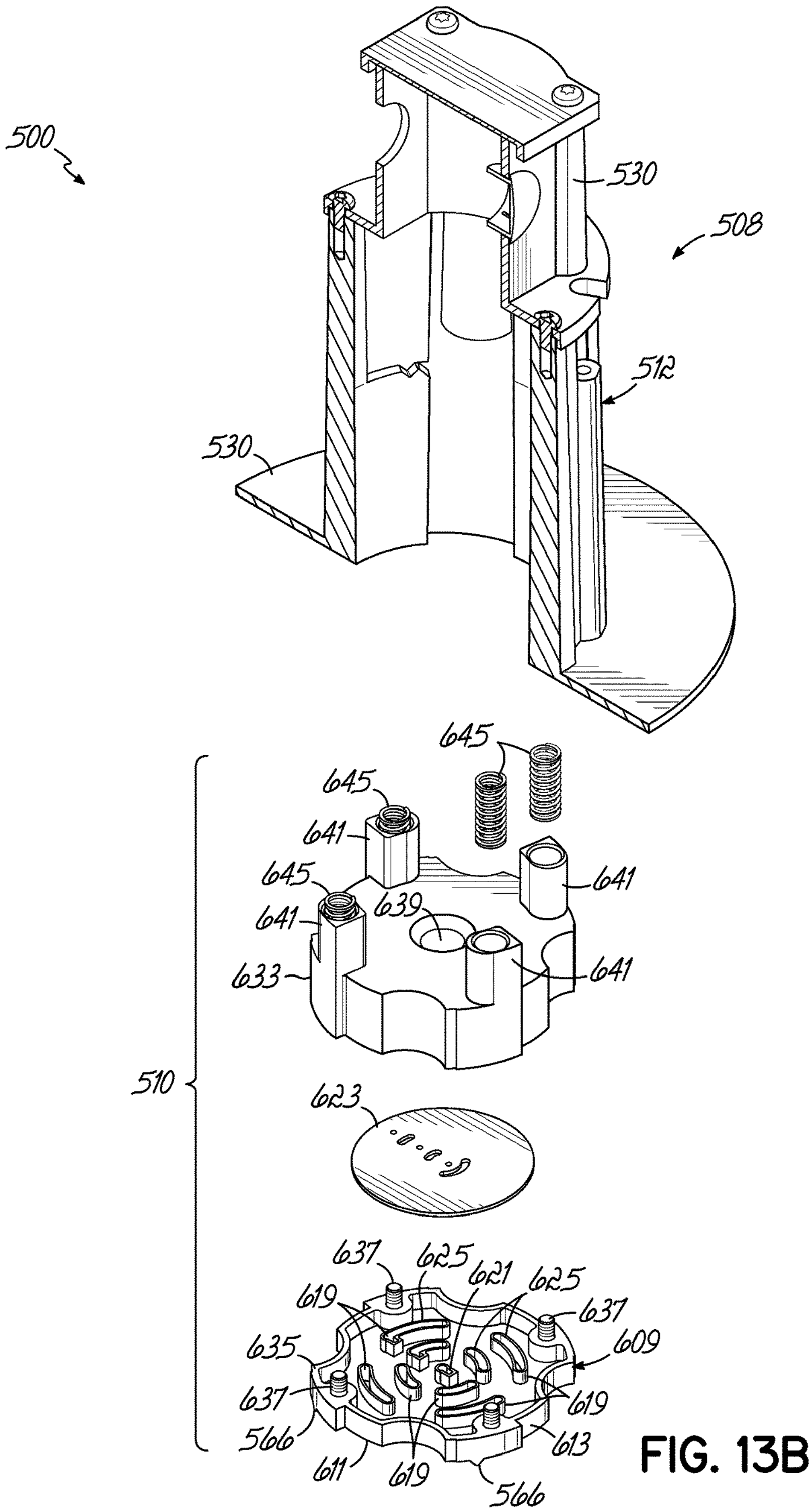
FIG. 13B is an exploded disassembled view of an exemplary spring-loaded electrical plunger for mounting within the canopy socket assembly of FIG. 12.

In one embodiment as shown in FIGS. 13B and 14A-14B, the electrical plunger 510 includes a cup-shaped bottom plate 609 having a bottom wall 611 and an annular side wall 613 that extends upwardly from the bottom wall 611. A series of arcuate slots 615 and a central aperture 617 are formed through the bottom wall 611, with each of the arcuate slots 615 having a respective arcuate slot wall 619 extending upwardly from the bottom wall 611. The central aperture 617 includes a generally circular central aperture wall 621 also extending upwardly from the bottom wall 611.

As shown in FIGS. 12, 13B-13C and 14A-14B, a circular printed circuit board disc 623 is supported on respective upper annular edges 625 of the arcuate slot walls 619 and the central aperture wall 621, with the printed circuit board 623 being electrically connected to primary electrical make-up conductors 626 (FIGS. 14A-14B).

As shown in FIG. 13C, the printed circuit board 623 has a lower side 627 which faces the series of arcuate slots 615 and the central aperture 617. In one embodiment, the lower side 627 of the printed circuit board 623 is provided with circular and concentric electrical traces 629 and a central electrical pad 631. Each of the circular electrical traces 629 and the central electrical pad 631 are electrically connected to the primary electrical make-up conductors 626 (FIGS. 14A-14B). The circular electrical traces 629 are in registry with the series of arcuate slots 615, and the central electrical pad 631 is in registry with the central aperture 617.

Referring to FIGS. 12, 13B, and 14A-14B, the electrical plunger 510 further includes a cover 633 that is mounted to an upper annular edge 635 of the annular side wall 613 of the bottom plate 609 of the electrical plunger 510 via fasteners 637 (FIG. 13B). The cover 633 includes a central aperture 639 to allow the primary electrical make-up conductors 626 to extend therethrough and be electrically connected to the printed circuit board 623 (FIGS. 14A-14B).

The cover 633 also includes four spring seats 641 which extend upwardly from a top wall 643 of the cover 633 and are configured to receive, respectively, four compression springs 645 within the spring seats 641. The compression springs 645 are captured between a bottom wall (not shown)

of each spring seat 641 and a bottom wall 647 of the electrical wiring enclosure or junction box 530 as shown in FIGS. 14A-14B.

During installation of the canopy luminaire 502 to the canopy socket assembly 508 mounted to the canopy deck 504, the luminaire 502, with its mating connector assembly 576, is mated to the canopy socket assembly 508 in one of four orientations. As shown in FIGS. 14A-14B, rotating the luminaire 502 relative to the canopy socket assembly 508 engages the cam/follower features 515 and 517 described above that "pull" the luminaire 502 toward the canopy socket assembly 508 during rotation of the luminaire 502, while the free ends of the connector pins 551*a*-551*c* of the luminaire mating connector assembly 576 and the circular electrical traces 629 and central electrical pad 631 of the electrical plunger 510 simultaneously engage to establish an electrical connection therebetween. Once enough rotation of the luminaire 502 has occurred, e.g., approximately 30°, nibs 566 (FIGS. 13B and 14A) provided on the lower annular edge 568 of the spring-loaded electrical plunger 510 located in the canopy socket assembly 508 engage detent features 539 (FIG. 13A) provided on upper horizontal faces 541 of the four mounting lugs 598 provided on the mating connector assembly 576, thereby inhibiting the luminaire 502 from further rotation and locking it in place relative to the canopy deck 504 as shown in FIG. 14B. In this position, the connector pins 551*a*-551*c* compress the springs 645 within the spring seats 641 in response to engagement of the free ends of the connector pins 551*a*-551*c* with the printed circuit board 623 as shown in FIG. 14B.

Now referring to another exemplary embodiment of the present invention as shown in FIGS. 15-19, a canopy luminaire mounting system 700 is provided, where like numerals represent like parts, although not necessarily identical, to the canopy luminaire mounting system 100 of FIGS. 1-7, the canopy mounting system 300 of FIGS. 8-11 and the canopy mounting system 500 of FIGS. 12-14, with corresponding similar parts numbered with a preceding numeral "7".

Similar to the canopy luminaire mounting system 300 of FIGS. 8-11 and the canopy mounting system 500 of FIGS. 12A-14, the canopy luminaire mounting system 700 of this exemplary embodiment provides both mechanical means of attachment of the canopy luminaire 702 to the canopy structure or deck 704 as well as simultaneous electrical connection of the canopy luminaire 702 with electrical connections from a source of power, from the bottom-side 706 of the canopy deck 704 during installation of the canopy luminaire 702. In other words, topside access to a source of power is not required during installation of the canopy luminaire 702 to the canopy deck 704.

The canopy luminaire mounting system 700 comprises, in one embodiment, as shown in FIGS. 15, 16A, 18A and 18B, a canopy socket assembly 708 that includes a spring-loaded electrical plunger 710 supported for vertical movement within a housing 712 of the canopy socket assembly 708. The electrical plunger 710 includes an outer surface 703 that is keyed with an inner surface 718 of an annular side wall 720 of the housing 712 to prevent rotation of the of the electrical plunger 719 relative to the housing 712 during vertical movement of the plunger 710 within the housing 712 as described in greater detail below.

In this embodiment, a luminaire 702 is provided having a mating connector assembly 776 which includes three radially outwardly projecting electrical connector blades 705*a*-705*c* (FIGS. 15A, 17A-17C and 19A-19B) which provide electrical connection of the luminaire 702 with the canopy socket assembly 708 mounted to a canopy deck 704 in a manner as described in detail below.

Figure 17A:
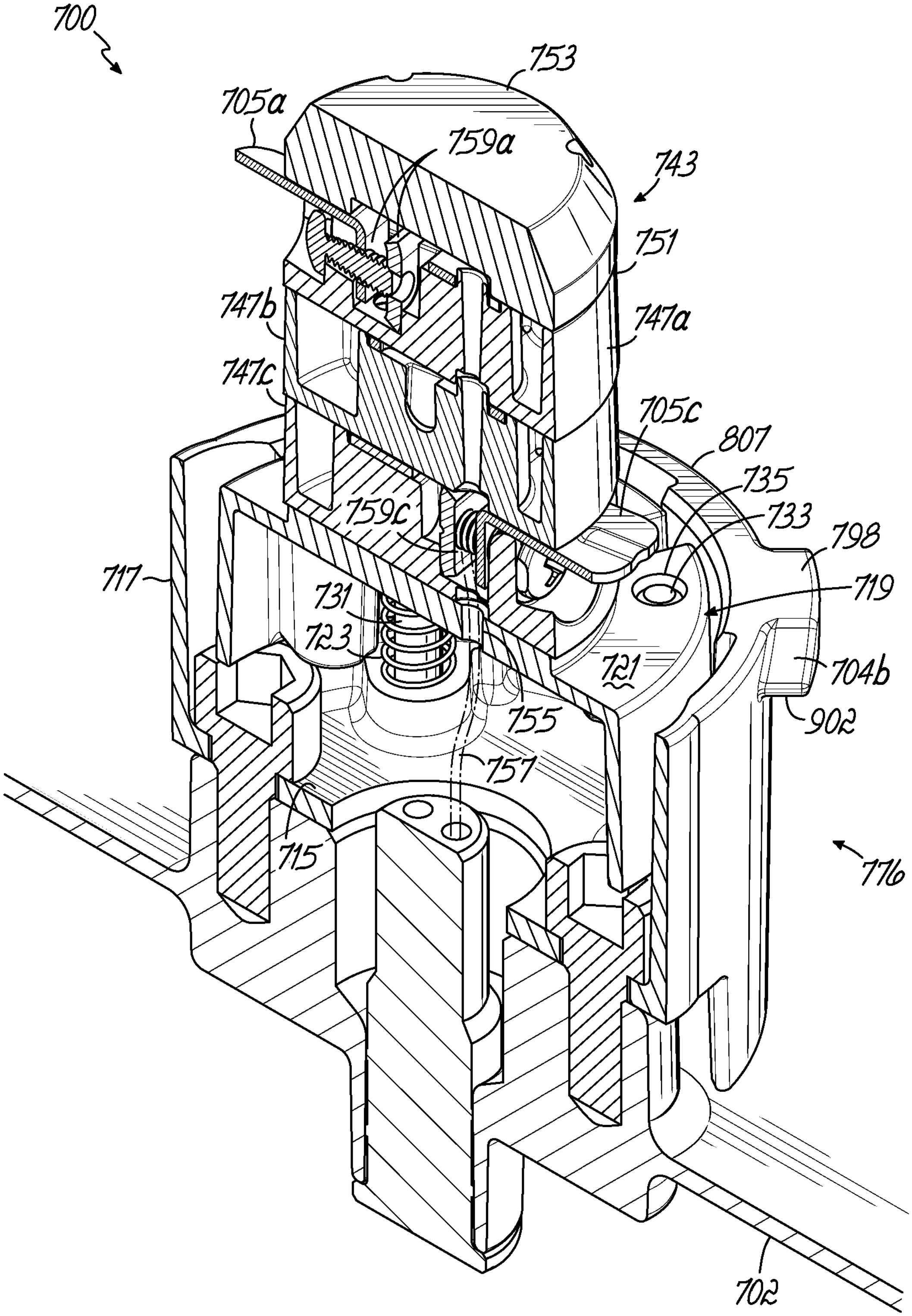
FIG. 17A is a cross sectional view of an exemplary mating connector assembly mounted to an upper surface of the canopy luminaire shown in FIG. 15.
Figure 17B:
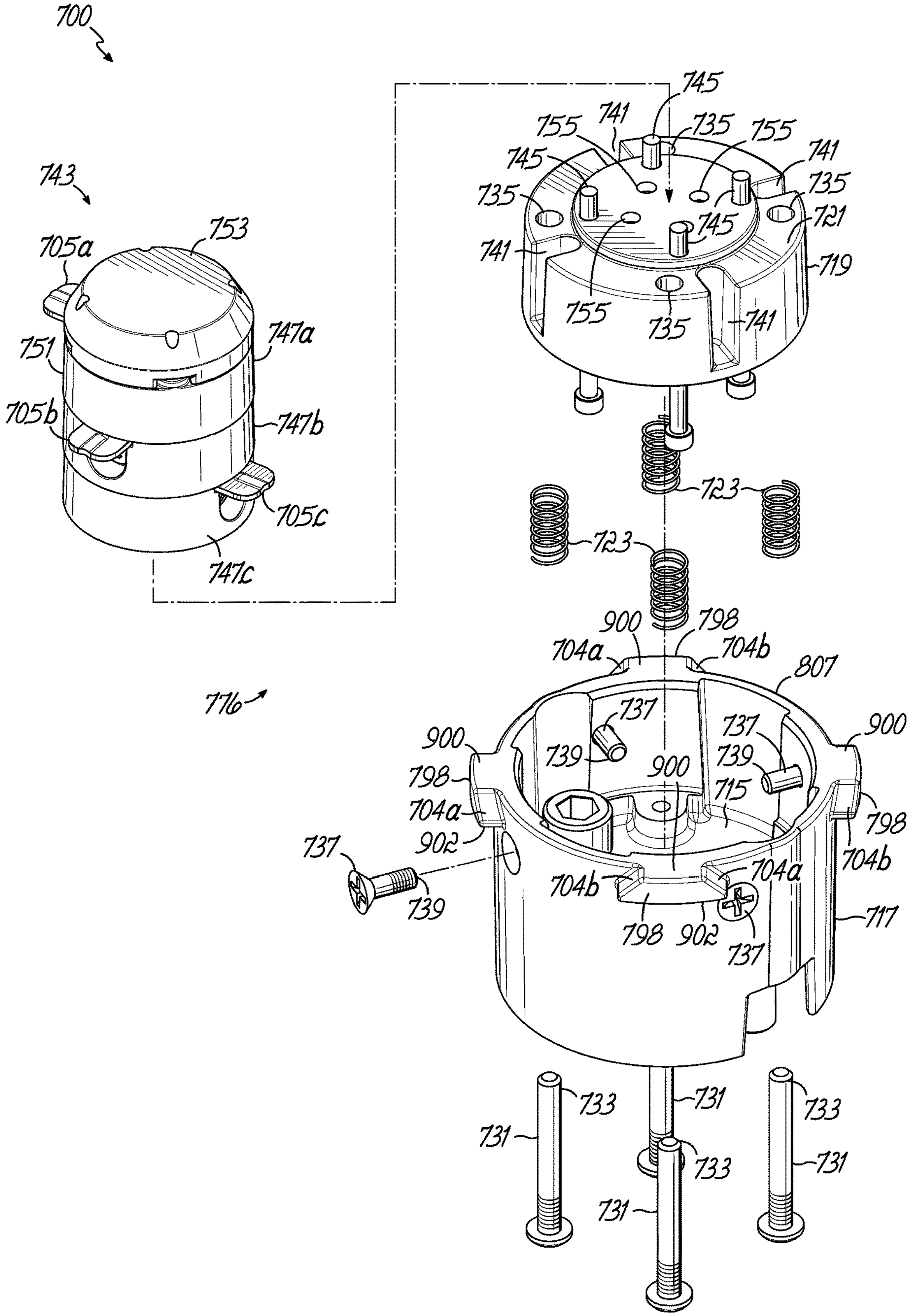
FIG. 17B is an exploded disassembled view of the mating connector assembly shown in FIG. 17A.
Figure 18A:
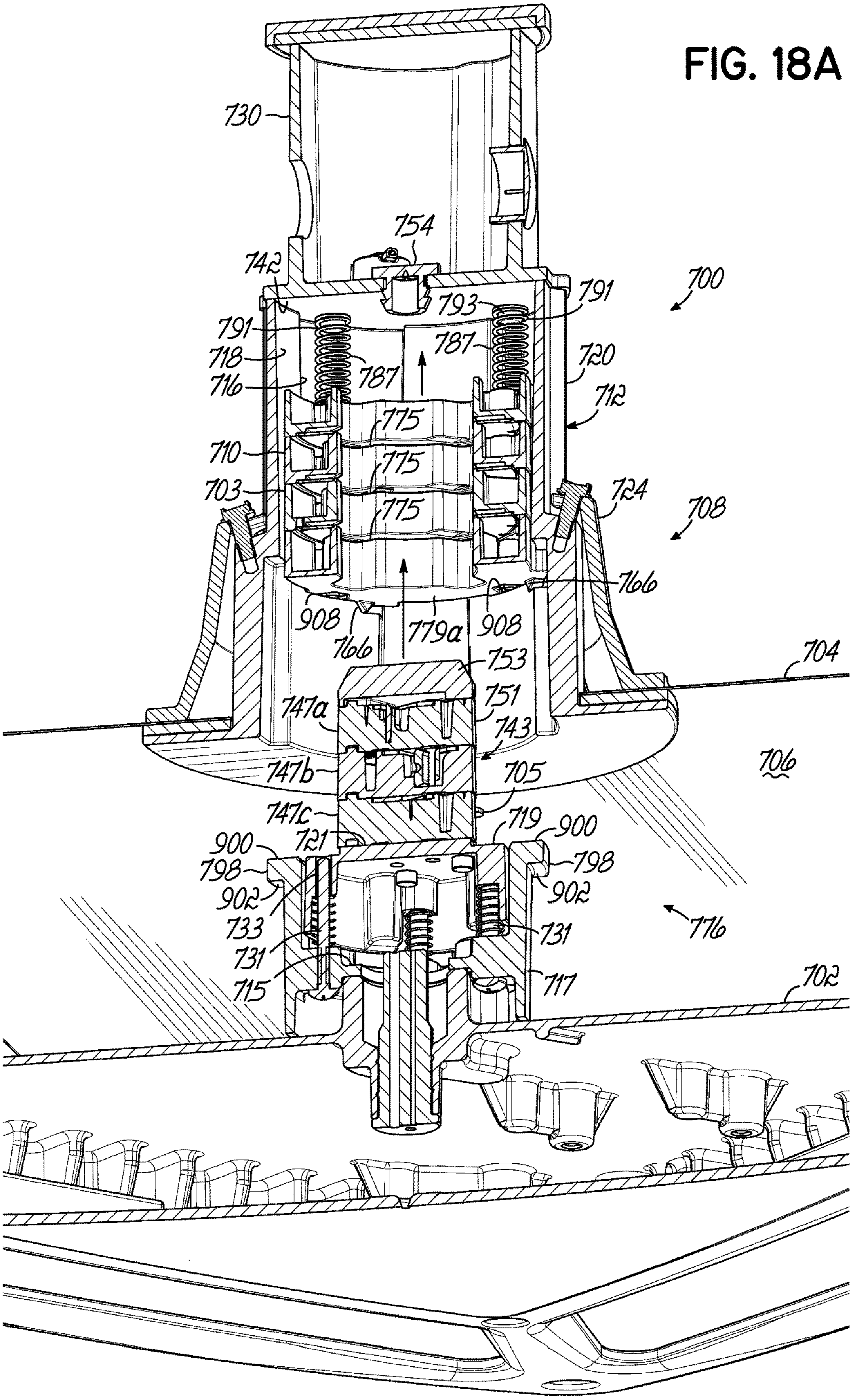
FIGS. 18A-18B are perspective views, in cross section, showing mounting of the canopy luminaire of FIG. 15 to the canopy deck.

As shown in FIGS. 17A-17B, the mating connector assembly 776 includes a bottom wall 715 and an annular side wall 717 that extends upwardly from the bottom wall 715. The mating connector assembly 776 includes an inverted cup-shaped connector mount 719 having a top wall 721 and an annular side wall 723 extending downwardly from the top wall 721. The connector mount 719 is mounted within the annular side wall 717 of the mating connector assembly 776 and is supported by four compression springs 723 for floating vertical movement of the connector mount 719 relative to the bottom wall 715 of the mating connector assembly 776 as shown in FIG. 17A. The springs 723 are mounted about four respective fasteners 731 which extend upwardly from the bottom wall 715 of the mating connector assembly 776 and bias the connector mount 719 upwardly relative to the bottom wall 715. The fasteners 731 are threaded to the bottom wall 715 of the mating connector assembly 776 and have free unthreaded ends 733 which are received in unthreaded bores 735 formed in the top wall 721 of the connection mount 719 (FIGS. 17B and 18A).

The floating connector mount 719 is prevented from rotation relative to the rest of the mating connector assembly 776 by four horizontally oriented fasteners 737 which extend radially inwardly into the mating connector assembly 776 through the annular side wall 717 of the mating connector assembly 776, as shown in FIG. 17B. The four horizontally oriented fasteners 737 have free ends 739 which are received to vertically travel in respective vertical channels 741 provided in the annular side wall 717 of the mating connector assembly 776.

An electrical connector blade assembly 743 is mounted to the top wall 721 of the connector mount 719 via fasteners 745 as shown in FIG. 17B. As shown in FIGS. 17A-17B, the electrical connector blade assembly 743 comprises, in one embodiment, a vertical stack of three spacer plates 747*a*-747*c*, each supporting a respective one of the electrical connector blade 705*a*-705*c* extending radially outwardly beyond an outer circumferential wall 751 of the electrical connector blade assembly 743. A cap 753 is mounted to the uppermost spacer plate 747*a*.

Figure 17C:
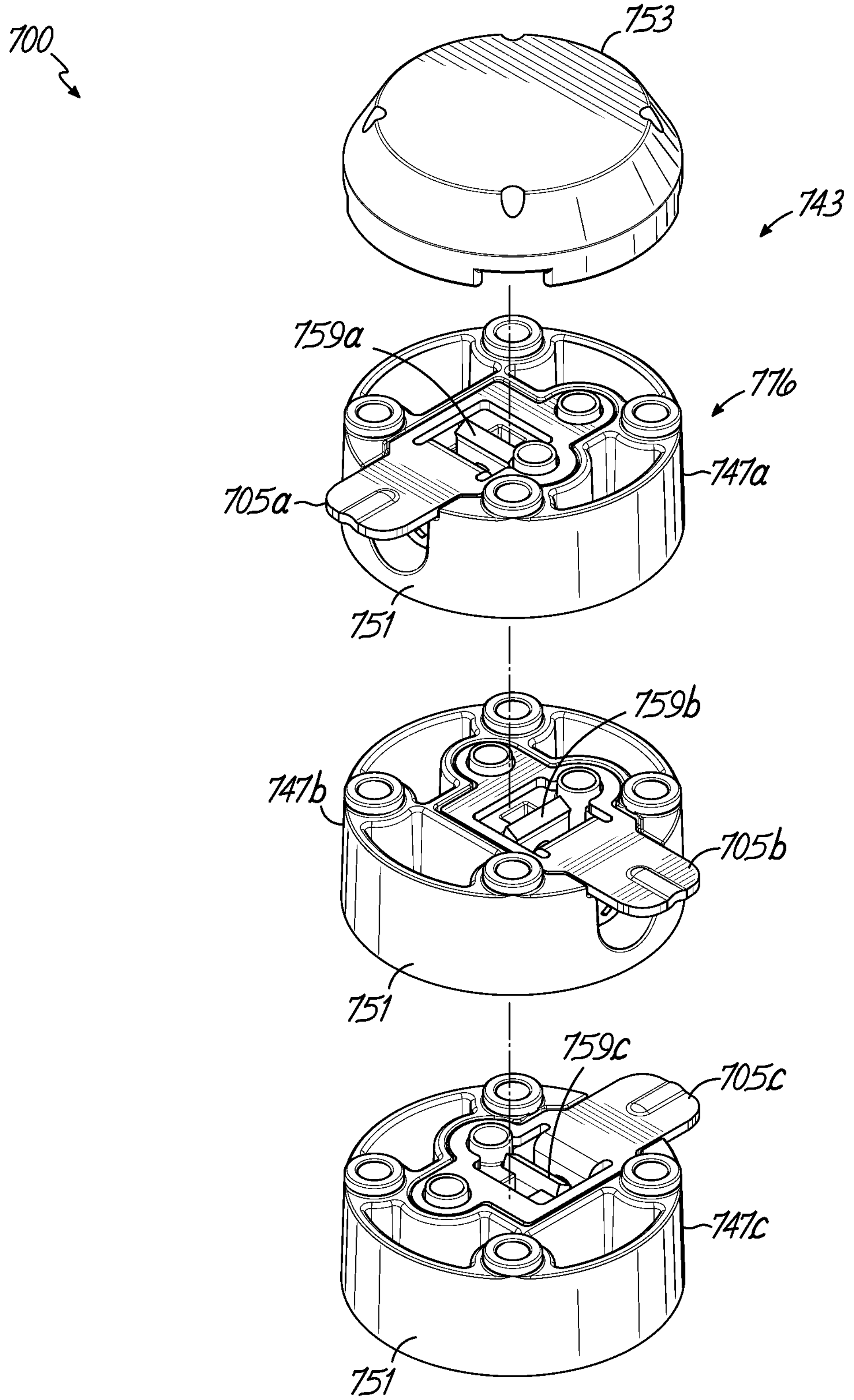
FIG. 17C is an exploded perspective view of an exemplary electrical connector blade assembly of the mating connector assembly of FIGS. 17A and 17B.

As shown in FIGS. 17B-17C, the three electrical connector blades 705*a*-705*c* are vertically offset from one another by the spacer plates 747*a*-747*c*, and each of the electrical connector blades 705*a*-705*c* is circumferentially offset from an adjacent electrical connector blade 749*a*-749*c* in 90° increments. The spacer plates 747*a*-747*c* are fabricated from an electrically insulating polymeric material.

As shown in FIGS. 17A-17B, the top wall 721 of the connector mount 719 includes multiple apertures 755 formed therethrough with allow internal luminaire electrical wiring 757 to pass through the apertures 755 to be electrically connected to the three electrical connector blades 705*a*-705*c*. As shown in FIGS. 17A and 17C, each of the electrical connector blades 705*a*-705*c* includes a respective screw-actuated clamp 759*a*-759*c* to securely establish an electrical connection of the internal luminaire electrical wiring 757 to the electrical connector blades 705*a*-705*c*.

Figure 16A:
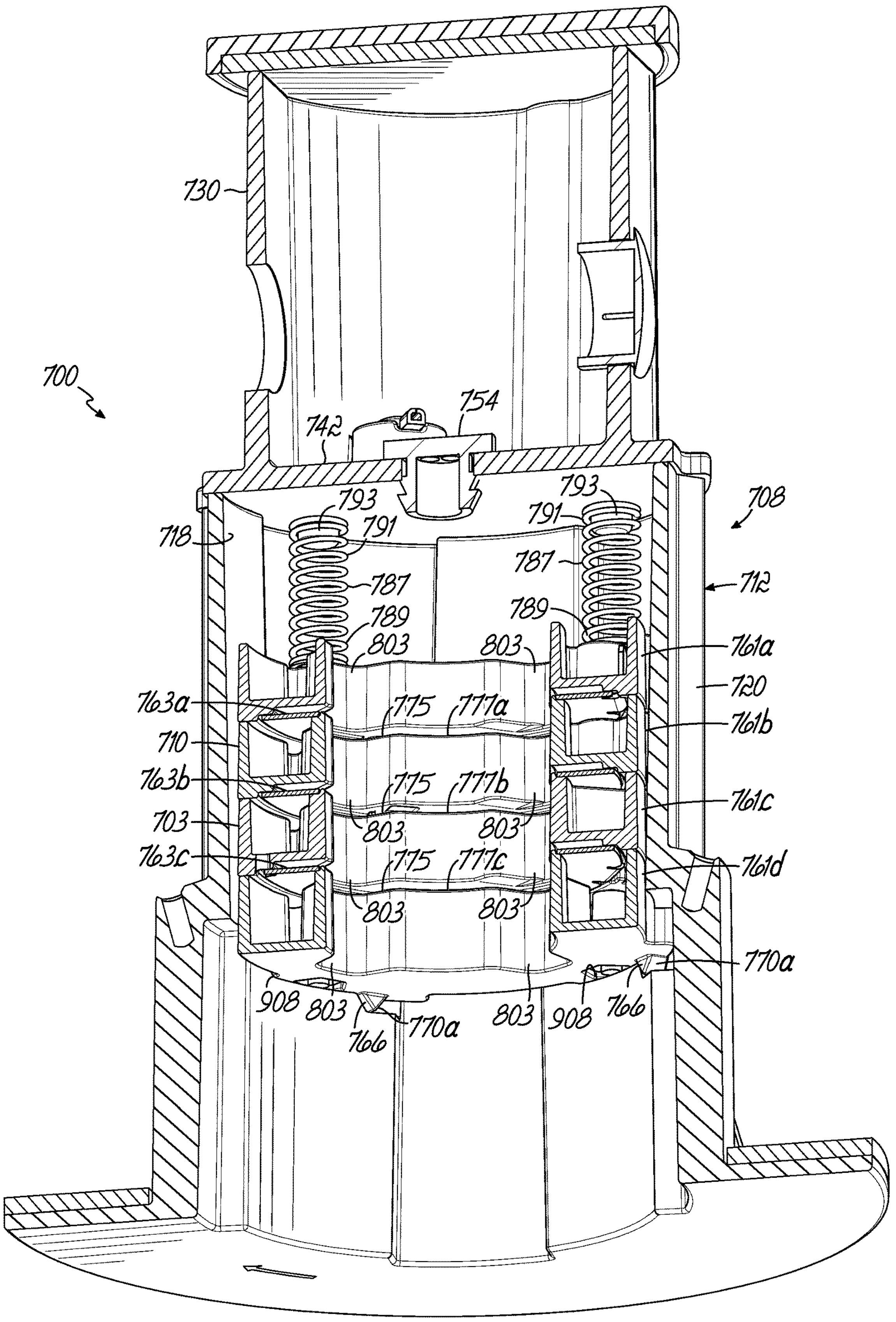
FIG. 16A is a perspective view, in cross section, showing mounting of an exemplary spring-loaded plunger within the canopy socket assembly of FIG. 15.
Figure 16B:
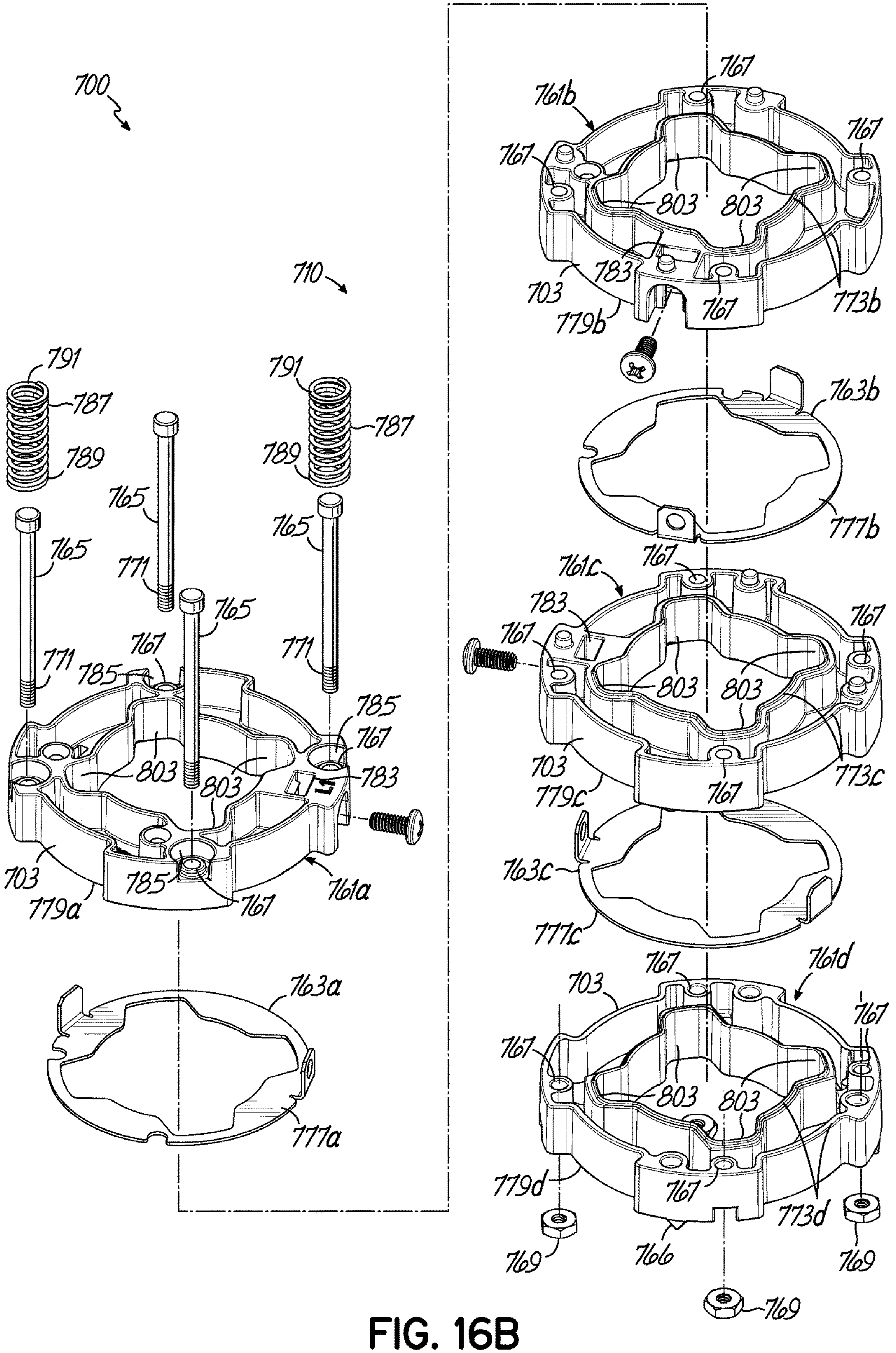
FIG. 16B is an exploded disassembled view of the spring-loaded electrical plunger of FIGS. 15 and 16A.

Referring now to FIGS. 15, 16A-16B and 18A-18B, the electrical plunger 710 comprises, in one embodiment, a vertical stack of four annular spacer plates 761*a*-761*d*, with the lower three annular spacer plates 761*b*-761*d* each supporting a respective annular electrical connector plate 763*a*-763*c*. As shown in FIG. 16B, the four annular spacer plates 761*a*-761*d* are joined together by four fasteners 765 which extend vertically through apertures 767 formed through the respective annular spacer plates 761*a*-761*d*. Four threaded nuts 769 are provided to threadably engage with the lower threaded ends 771 of the four fasteners 765.

Figure 18B:
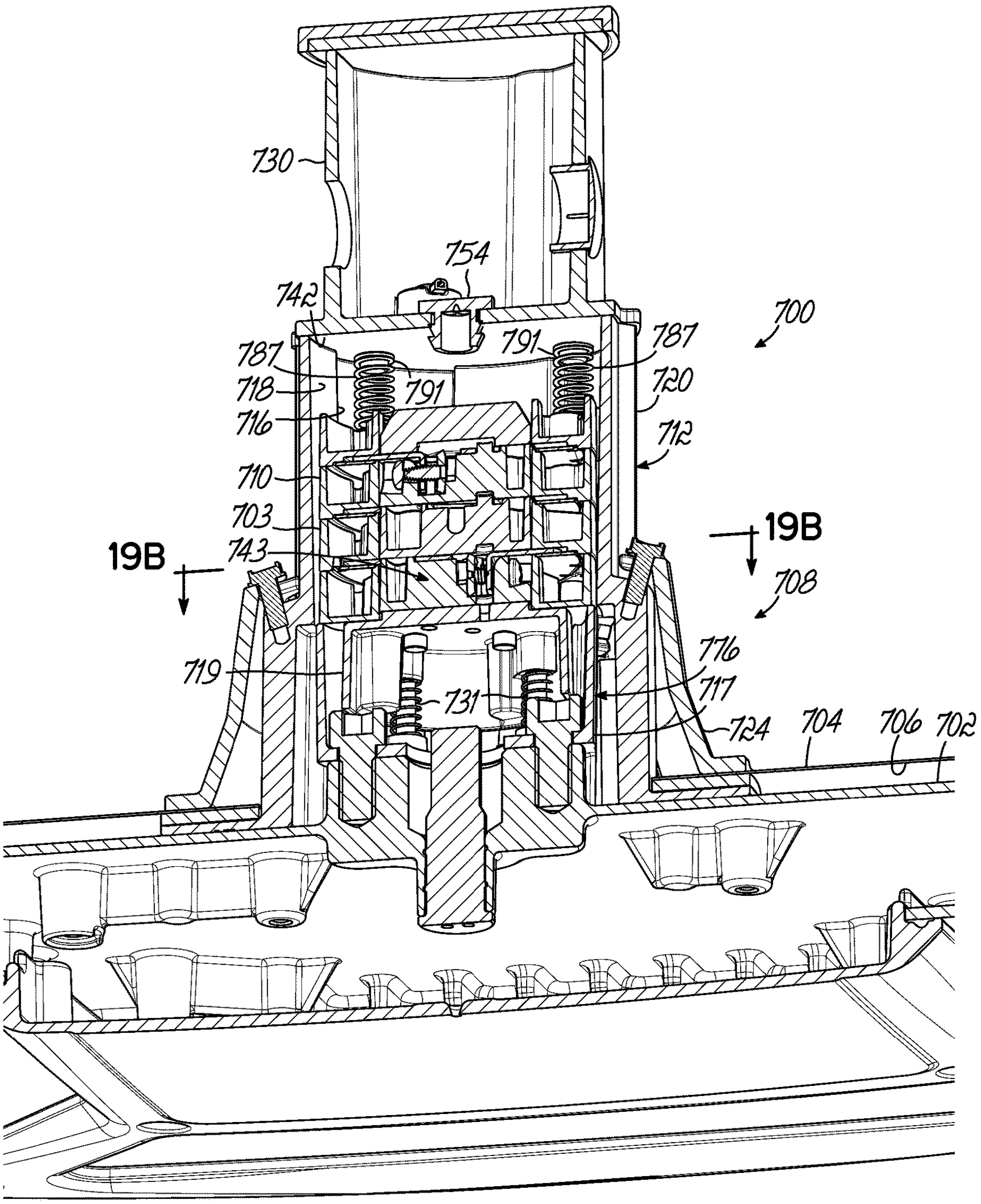

When the four annular spacer plates 761*a*-761*c* are assembled together, with the three annular electrical connector plates 763*a*-763*c* supported on upper surfaces 773*b*-773*d* of the lower three annular spacer plates 761*b*-761*d*, annular horizontal channels 775 are formed between an upper surface 777*a*-777*c* of each annular electrical connector plate 763*a*-763*c* and a respective bottom surface 779*a*-779*c* of an adjacent annular spacer plate 761*a*-761*c*, i.e., the bottom surfaces 779*a*-779*c* of the three upper annular spacer plates 761*a*-761*c* as shown in FIGS. 18A-18B. The annular horizontal channels 775 are configured to allow the respective electrical connector blades 705*a*-705*c* to rotate within the annular horizontal channels 775 during rotation of the luminaire 702 as described in detail below, to thereby establish an electrical connection between each of the electrical connector blades 705*a*-705*c* and a respective annular electrical connector plate 763*a*-763*c* as shown in FIG. 19B.

The primary make-up conductors (not shown) are routed through the grommet 754 provided in the bottom wall 742 of the electrical wiring enclosure or junction box 730 to each of the annular electrical connector plates 763*a*-763*c*. Each of the three upper annular spacer plates 761*a*-761*c* includes a respective screw-actuated clamp 783 to securely establish an electrical connection of the primary make-up conductors (not shown) to the annular electrical connector plates 763*a*-763*c* as shown in FIG. 16B.

A spring-lock mechanism 820, locking ring 724 and annular gasket 728 are provided with the canopy luminaire locking system 700 similar to the other various embodiments as described in detail above in connection with FIGS. 1-14.

As shown in FIGS. 15, 16A-16B and 18A-18B, the uppermost annular spacer plate 761*a* of the electrical plunger 710 includes four spring seats 785 that each receive a respective spring 787. In one embodiment, each of the springs 787 is oriented vertically and has one free end 789 supported in the respective spring seat 785 and the opposite free ends 791 of the springs 787 receive respective bosses 793 which extend downwardly from the bottom wall 742 of the electrical wiring enclosure or junction box 730. The bosses 793 are in vertical registry with the respective free ends 791 of the springs 787 and the four spring seats 785. The free ends 791 of the springs 787 receive the respective bosses 793 so that the respective positions of the springs 787 are maintained between the spring seats 785 and the bosses 793. The four springs 787 are located between the four spring seats 785 and the bottom wall 742 of the electrical wiring enclosure or junction box 730 so that the springs 787 bias the electrical plunger 710 downwardly within the housing 712, but the springs 787 are compressible so as to allow the electrical plunger 710 to move upwardly within the housing 712 in response to an upward vertical force being applied to the electrical plunger 710 as will be described in greater detail below.

Figure 19A:
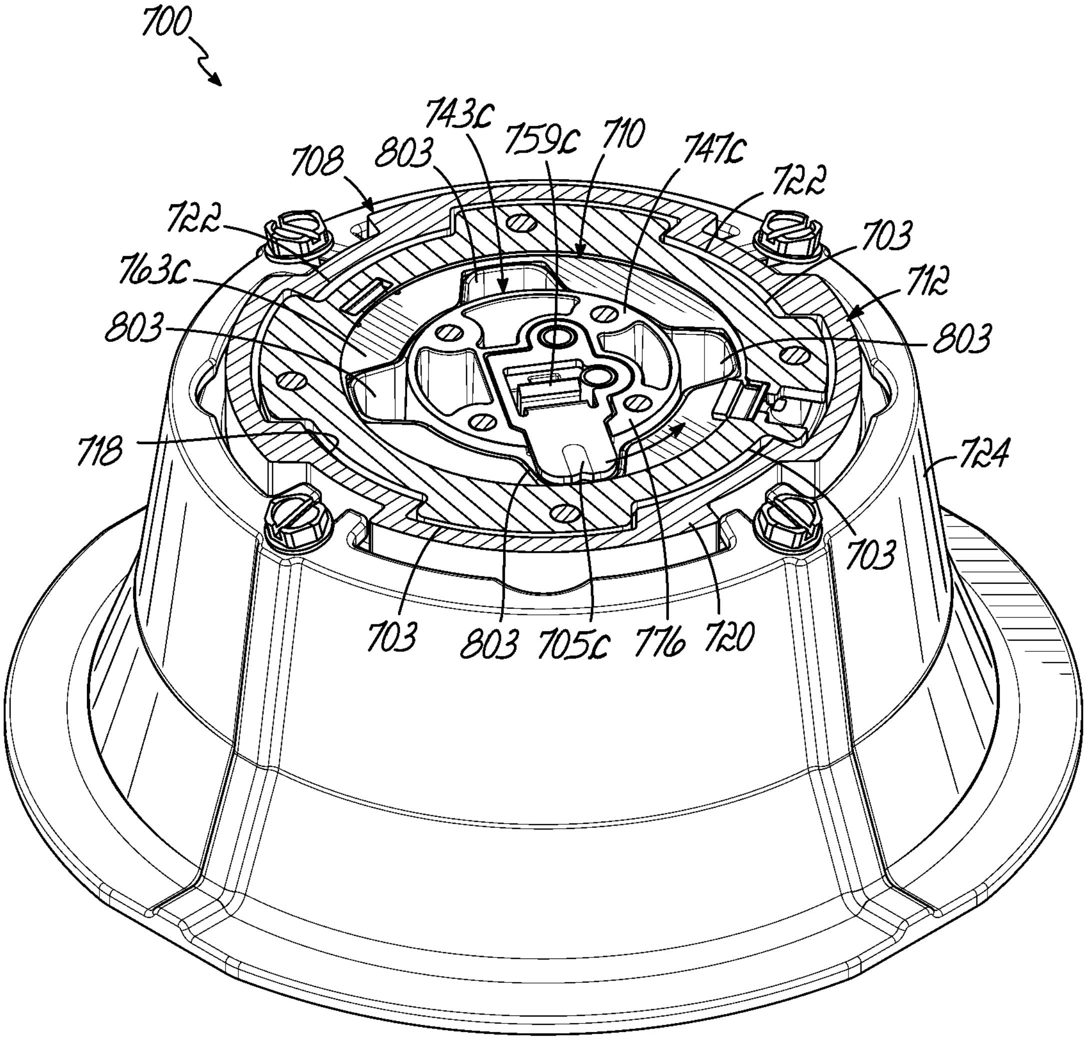
FIG. 19A is a cross sectional view of the canopy socket assembly of FIG. 18B, prior to rotation of the canopy luminaire relative to the canopy socket assembly.
Figure 19B:
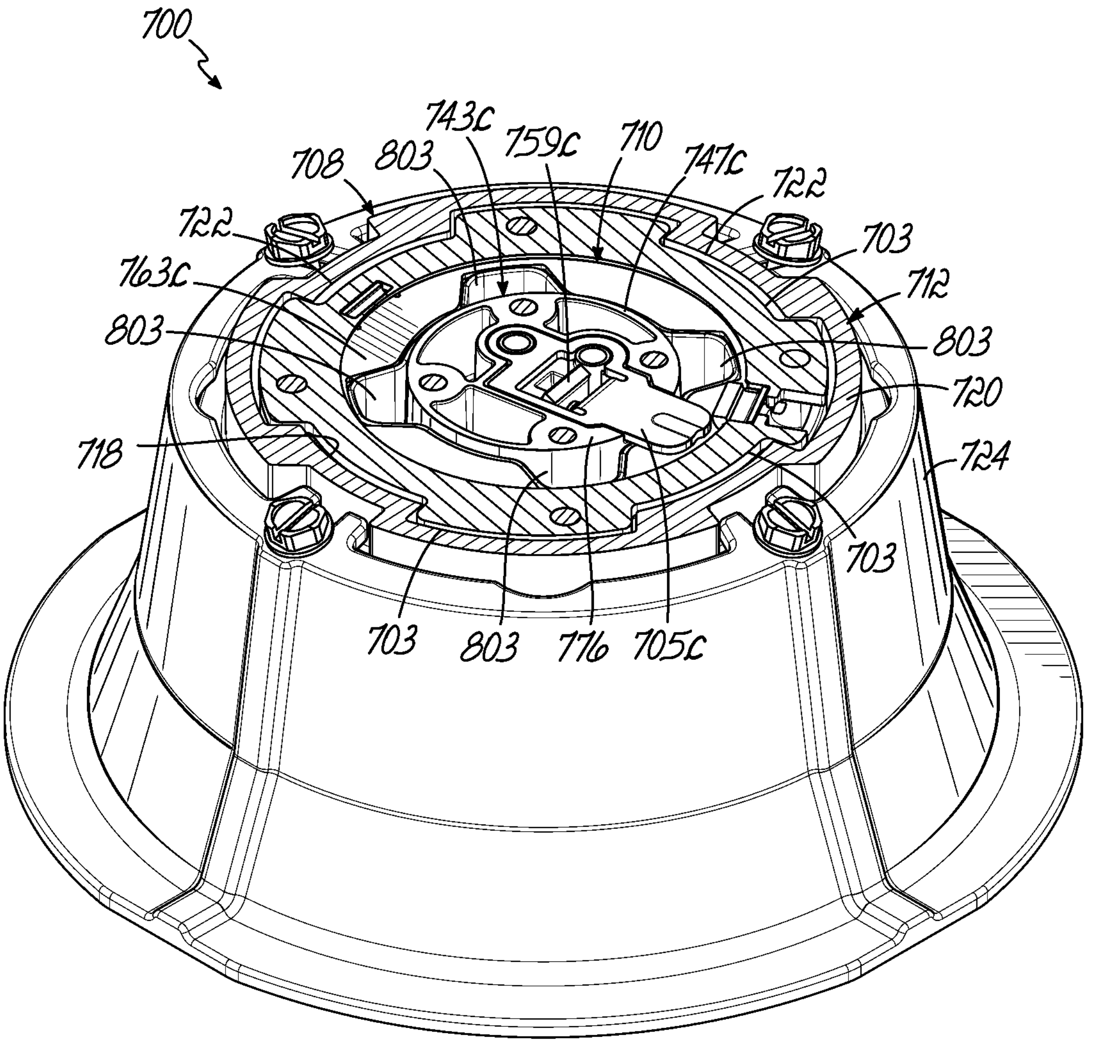
FIG. 19B is a cross sectional view taken along line 19B-19B of FIG. 18B.

As shown in FIGS. 16B and 19A-19B, each of the annular spacer plates 761*a*-761*c* is provided with four lobes 803 which extend radially outwardly in 90° increments from a central aperture 805 of each annular spacer plate 747*a*-747*c*. The four lobes 803 provided in each annular spacer plate 761*a*-761*d* are provided to allow the three electrical connector blades 705*a*-705*c* of the mating connector assembly 776 to travel vertically within the electrical plunger 710 prior to rotation of the luminaire 702 relative to the canopy socket assembly 708 during installation of the luminaire 702 to the canopy deck 704.

During installation of the canopy luminaire 702 to the canopy socket assembly 708 mounted to the canopy deck 704, the luminaire 702, with its mating connector assembly 776, is inserted into the canopy socket assembly 708 as shown in FIG. 18A in one of four orientations, spaced 90° apart, as described above.

The mounting lugs 798 of the mating connector assembly 776 are free to travel vertically upwardly within the respective vertical channels 724 formed in the annular side wall 720 of the housing 712 until the upper annular edge 807 of the mating connector assembly 776 abuts lower horizontal faces (not shown) of the ribs 722 provided in the annular side wall 120 of the housing 712 of the canopy socket assembly 708 as described above.

Once the upper annular edge 807 of the mating connector assembly 776 abuts the lower horizontal faces (not shown) of the ribs 722, the luminaire 702 with its mating connector assembly 776 is free to be rotated relative to the canopy socket assembly 708 as shown in FIGS. 19A-19B so that the leading ramp faces 704*a* of the mounting lugs 798 engage a confronting face 770*a* of a respective nib 766 provided on a bottom surface 779*d* of the lowermost annular spacer plate 761*d* (FIGS. 16A-16B and 18A.

As the luminaire 702 and its mating connector assembly 776 are further rotated in the counterclockwise direction, the leading ramp faces 704*a* of the mounting lugs 798 cause the nibs 766, and thus the electrical plunger 710, to move vertically upwardly to a raised position within the housing 712 against the bias of the springs 787 as the nibs 766 travel up the respective leading ramp faces 704*a* of the mounting lugs 798.

In response to further rotation of the luminaire 702 and its mating connector assembly 776, the nibs 766 travel across the respective horizontal top faces 900 of the mounting lugs 798 while the horizontal bottom faces 902 of the mounting lugs 798 engage respective horizontal ledges 908 provided in the inner surface 718 of the housing 712 as shown in FIG. 18B.

Once enough rotation has occurred, e.g., approximately 30°, the nibs 766 travel down the trailing ramp faces 704*b* of the respective mounting lugs 798 as described above to lock the luminaire 702 in the canopy socket assembly 708 as shown in FIG. 18B. In this locked position, the electrical plunger 710 is lowered from its temporary raised position in response to the downward force applied to the electrical plunger 710 by the springs 787 so that the bottom surface 779*d* of the electrical plunger 710, i.e., the bottom surface 779*d* of the lowermost annular spacer plate 761*d*, abuts the upper annular edge 807 of the mating connector assembly 776 of the luminaire 702 as shown in FIG. 18B. Also, in this locked position, each mounting lug 798 is captured between the respective vertical side wall 716 (FIG. 18A) of a respective vertical channel 724 of the housing 712 and a respective nib 766 engaged with a trailing ramp face 704*b* of each mounting lug 798 as described in detail above.

In the locked position as shown in FIGS. 18B and 19B, the electrical connector blades 705*a*-705*c* are rotated in the respective annular horizontal channels 775 to thereby establish an electrical connection between each of the electrical connector blades 705*a*-705*c* and a respective annular electrical connector plate 763*a*-763*c* as shown in FIG. 19B.

Each of the canopy luminaire mounting systems 100, 300, 500 and 700 of the present invention as described in detail above provides the following advantages:

(i) increased reliability and quality of luminaire installation;

(ii) reduced labor time and simplicity of luminaire install;

(iii) requires only one penetration hole through the canopy deck;

(iv) removes the need to install the luminaire prior to running the electrical connections topside of the canopy, thereby allowing flexibility on the job site as to when electrical make-up is performed; and (v) removes the need to access the topside of the canopy for maintenance and/or removal of the luminaire.

While preferred embodiments have been described above with reference to the drawings, a person skilled in the art will understand that these embodiments have been provided for illustrative purposes only and should in no way be construed as limiting the scope of the present invention which is defined by the claims.

What is claimed is:

1. A canopy luminaire mounting system, comprising:

a canopy socket assembly configured to be mounted to a canopy structure;

a plunger mounted for vertical movement within the canopy socket assembly; and a canopy luminaire having a mating connector assembly that is configured to be received by the canopy socket assembly, wherein the canopy luminaire is removably secured to the canopy socket assembly in response to relative rotation of the canopy luminaire and the canopy socket assembly about a vertical axis.

2. The canopy luminaire mounting system of claim 1, wherein the canopy luminaire is removably secured to the canopy socket assembly in response to rotation of the canopy luminaire relative to the canopy socket assembly about the vertical axis.

3. The canopy luminaire mounting system of claim 1, wherein the canopy socket assembly is configured to be received in a canopy penetration hole formed in the canopy structure from a bottom-side of the canopy structure, and further wherein the canopy socket assembly includes a spring-lock mechanism that is configured to engage a topside of the canopy structure to retain the canopy socket assembly in the canopy penetration hole.

4. The canopy luminaire mounting system of claim 3, further comprising a locking ring attached to the canopy socket assembly and configured to engage the topside of the canopy structure.

5. The canopy luminaire mounting system of claim 4, further comprising a radially outwardly directed annular flange provided adjacent one end of the canopy socket assembly and an annular gasket disposed about the canopy socket assembly and being configured to be positioned between the annular flange and the bottom-side of the canopy structure.

6. The canopy luminaire mounting system of claim 1, wherein the canopy socket assembly includes at least one first electrical contact and the mating connector assembly of the canopy luminaire includes at least one second electrical contact that cooperates with the at least one first electrical contact to establish an electrical connection therebetween.

7. The canopy mounting luminaire system of claim 6, wherein the at least one first electrical contact comprises an electrical connector provided at a remote end of a wiring harness and the at least one second electrical contact comprises an electrical socket which is configured to electrically connect with the electrical connector.

8. The canopy luminaire mounting system of claim 6, wherein the at least one first electrical contact comprises a plurality of first electrical contacts and the at least one second electrical contact comprises a plurality of second electrical contacts.

9. The canopy luminaire mounting system of claim 1, wherein the canopy socket assembly includes at least one first electrical contact and the mating connector assembly of the canopy luminaire includes at least one second electrical contact that cooperates with the at least one first electrical contact to establish an electrical connection therebetween in response to the relative rotation of the canopy luminaire and the canopy socket assembly about the vertical axis.

10. The canopy luminaire mounting system of claim 9, wherein the plunger is an electrical plunger; and wherein the at least one electrical contact is provided on the electrical plunger.

11. The canopy luminaire mounting system of claim 10, wherein the electrical plunger is keyed with an inner surface of the canopy socket assembly to prevent rotation of the electrical plunger within the canopy socket assembly.

12. The canopy luminaire mounting system of claim 11, wherein the electrical plunger is vertically biased relative to the canopy socket assembly by at least one spring mounted between the electrical plunger and the canopy socket assembly.

13. The canopy luminaire mounting system of claim 10, wherein the electrical plunger supports a plurality of female electrical contacts.

14. The canopy luminaire mounting system of claim 10, wherein the electrical plunger supports a plurality of electrical traces and/or electrical pads.

15. The canopy luminaire mounting system of claim 10, wherein the electrical plunger supports a plurality of annular electrical connector plates.

16. The canopy luminaire mounting system of claim 1, wherein the plunger is keyed with an inner surface of the canopy socket assembly to prevent rotation of the plunger within the canopy socket assembly.

17. The canopy luminaire mounting system of claim 16, wherein the plunger is vertically biased relative to the canopy socket assembly by at least one spring mounted between the plunger and the canopy socket assembly.

18. The canopy luminaire mounting system of claim 1, wherein the mating connector assembly includes an annular side wall and a plurality of mounting lugs extending radially outwardly from the annular side wall.

19. The canopy luminaire mounting system of claim 18, wherein the plurality of mounting lugs are configured to cooperate with an inner surface of the canopy socket assembly to removably secure the canopy luminaire to the canopy socket assembly in response to relative rotation of the canopy luminaire and the canopy socket assembly about the vertical axis.

20. The canopy luminaire mounting system of claim 1, further comprising a connector mount supported by the mating connector assembly.

21. The canopy luminaire mounting system of claim 20, wherein the connector mount supports an electrical connector electrically coupled to the luminaire.

22. The canopy luminaire mounting system of claim 20, wherein the connector mount supports a plurality of male electrical contacts.

23. The canopy luminaire mounting system of claim 20, wherein the connector mount supports a plurality of spring biased connector pins.

24. The canopy luminaire mounting system of claim 20, wherein the connector mount supports a plurality of electrical connector blades.

25. A method of installing a canopy luminaire to a canopy structure, comprising:

mounting a canopy socket assembly through a penetration hole of the canopy structure from a bottom-side of the canopy structure;

mounting a plunger for vertical movement within the canopy socket assembly; and inserting a mating connector assembly of the canopy luminaire into the canopy socket assembly, wherein the canopy luminaire is removably secured to the canopy socket assembly in response to relative rotation of the canopy luminaire and the canopy socket assembly about a vertical axis.

26. The method of claim 25, wherein the mating connector assembly includes an annular side wall and a plurality of mounting lugs extending radially outwardly from the annular side wall.

27. The method of claim 26, wherein the plurality of mounting lugs cooperate with an inner surface of the canopy socket assembly to removably secure the canopy luminaire to the canopy socket assembly in response to relative rotation of the canopy luminaire and the canopy socket assembly.

28. The method of claim 26, wherein the canopy socket assembly includes at least one first electrical contact and the mating connector assembly of the canopy luminaire includes at least one second electrical contact that cooperates with the at least one first electrical contact to establish an electrical connection therebetween in response to the relative rotation of the canopy luminaire and the canopy socket assembly.

* * * * *